(12) United States Patent
Park et al.

(10) Patent No.: US 12,625,840 B2
(45) Date of Patent: May 12, 2026

(54) INTERFACE DEVICE AND METHOD OF OPERATING THE SAME

(71) Applicant: SK hynix Inc., Icheon-si (KR)

(72) Inventors: Dae Sik Park, Icheon-si (KR); Byung Cheol Kang, Icheon-si (KR); Seung Duk Cho, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/644,860

(22) Filed: Apr. 24, 2024

(65) Prior Publication Data

US 2024/0275573 A1      Aug. 15, 2024

Related U.S. Application Data

(60) Continuation of application No. 17/840,340, filed on Jun. 14, 2022, now Pat. No. 12,132,814, which is a (Continued)

(30) Foreign Application Priority Data

Jun. 16, 2020      (KR) ........................ 10-2020-0073157

(51) Int. Cl.
  *H04L 25/00*          (2006.01)
  *G06F 1/08*          (2006.01)
  (Continued)

(52) U.S. Cl.
  CPC ............ *G06F 13/4291* (2013.01); *G06F 1/08* (2013.01); *G06F 13/4022* (2013.01); (Continued)

(58) Field of Classification Search
  CPC .... G06F 13/4291; G06F 1/08; G06F 13/4022; G06F 13/4059; G06F 13/4273; (Continued)

(56) References Cited

U.S. PATENT DOCUMENTS 4,692,894 A      9/1987  Bemis
5,025,457 A      6/1991  Ahmed
(Continued)

FOREIGN PATENT DOCUMENTS

CN          1098838 A      2/1995
CN          1337801 A      2/2002
(Continued)

OTHER PUBLICATIONS

Froelich, Dan, et al., "PCIe® 5.0 Electrical Update", PCI-SIG 2018, 49 pages.
(Continued)

*Primary Examiner* — Phuong Phu
(74) *Attorney, Agent, or Firm* — Perkins Coie LLP

(57)          ABSTRACT

A method of operating an interface device including a first elastic buffer is provided. The method of operating the interface device includes performing a link equalization operation, checking a transmission mode of the interface device, and determining a transmission parameter of the interface device based on a status of the first elastic buffer or a status of a second elastic buffer included in another interface device communicating with the interface device when the transmission mode is a transmission parameter adjustment mode.

31 Claims, 18 Drawing Sheets

<u>300a</u>

Related U.S. Application Data division of application No. 17/349,775, filed on Jun. 16, 2021, now Pat. No. 11,546,128.

(51) Int. Cl.

| | |
|---|---|
| *G06F 13/40* | (2006.01) |
| *G06F 13/42* | (2006.01) |
| *H03D 3/24* | (2006.01) |
| *H04L 7/00* | (2006.01) |
| *H04L 7/033* | (2006.01) |
| *H04L 25/40* | (2006.01) |

(52) U.S. Cl.
CPC .......... *G06F 13/4059* (2013.01); *H04L 7/005* (2013.01); *H04L 7/0079* (2013.01); *H04L 7/0091* (2013.01); *H04L 7/033* (2013.01)

(58) Field of Classification Search
CPC ..... H04L 7/005; H04L 7/0079; H04L 7/0091; H04L 7/033
USPC ................................. 375/372, 373, 375, 376
See application file for complete search history.

(56) References Cited

U.S. PATENT DOCUMENTS

| | | | |
|---|---|---|---|
| 5,844,891 | A | 12/1998 | Cox |
| 5,958,027 | A | 9/1999 | Gullick |
| 6,029,194 | A | 2/2000 | Tilt |
| 6,061,802 | A | 5/2000 | Gullick |
| 6,279,058 | B1 | 8/2001 | Gullick |
| 7,103,125 | B1 | 9/2006 | Crutchfield |
| 7,295,578 | B1 | 11/2007 | Lyle |
| 8,285,884 | B1 | 10/2012 | Norrie |
| 8,879,680 | B2 | 11/2014 | Tresidder et al. |
| 9,337,934 | B1 | 5/2016 | Agazzi |
| 10,862,478 | B2 | 12/2020 | Hwang |
| 11,546,128 | B2 | 1/2023 | Jeon et al. |
| 11,599,495 | B2 | 3/2023 | Jeon et al. |
| 11,726,947 | B2 * | 8/2023 | Park .................... H04L 7/0091 |
| | | | 710/106 |
| 11,782,792 | B2 | 10/2023 | Jeon et al. |
| 2002/0024970 | A1 | 2/2002 | Amaral |
| 2002/0187798 | A1 | 12/2002 | Young |
| 2003/0122574 | A1 | 7/2003 | Kushida |
| 2004/0263427 | A1 | 12/2004 | Horigan |
| 2006/0209684 | A1 | 9/2006 | Bei |
| 2007/0001882 | A1 | 1/2007 | Zhang |
| 2007/0011389 | A1 | 1/2007 | Nishikawa |
| 2007/0041391 | A1 | 2/2007 | Lin |
| 2007/0177701 | A1 | 8/2007 | Thanigasalam |
| 2007/0204137 | A1 | 8/2007 | Tran |
| 2007/0233411 | A1 * | 10/2007 | Suto ................. G01R 31/31727 |
| | | | 702/89 |
| 2008/0100350 | A1 | 5/2008 | Pernia |
| 2008/0141063 | A1 | 6/2008 | Ridgeway |
| 2009/0059962 | A1 | 3/2009 | Schmidt |
| 2009/0317013 | A1 | 12/2009 | Yang |
| 2010/0054385 | A1 | 3/2010 | Chien et al. |
| 2010/0061424 | A1 | 3/2010 | Germann et al. |
| 2010/0114584 | A1 | 5/2010 | Weng |
| 2011/0243211 | A1 | 10/2011 | Chacko et al. |
| 2012/0140781 | A1 | 6/2012 | Green |
| 2012/0257699 | A1 | 10/2012 | Choi |
| 2013/0235887 | A1 | 9/2013 | Mamidwar |
| 2013/0343528 | A1 | 12/2013 | Polland |
| 2014/0006675 | A1 | 1/2014 | Meir |
| 2014/0101356 | A1 | 4/2014 | Sonoda |
| 2014/0126612 | A1 * | 5/2014 | Tresidder ............ G06F 13/4273 |
| | | | 375/259 |
| 2015/0131766 | A1 | 5/2015 | Chen et al. |
| 2015/0350656 | A1 | 12/2015 | Chung |
| 2016/0092335 | A1 | 3/2016 | Boelter |
| 2016/0139622 | A1 | 5/2016 | Barner |
| 2016/0277302 | A1 | 9/2016 | Olsen |
| 2017/0262290 | A1 | 9/2017 | Yasin |
| 2017/0315956 | A1 | 11/2017 | Choi et al. |
| 2018/0004686 | A1 | 1/2018 | Chen |
| 2018/0089125 | A1 | 3/2018 | Berke |
| 2018/0181457 | A1 | 6/2018 | Ebisawa |
| 2018/0267850 | A1 | 9/2018 | Froelich et al. |
| 2018/0285227 | A1 | 10/2018 | Sharma et al. |
| 2018/0331864 | A1 | 11/2018 | Das Sharma |
| 2019/0041820 | A1 | 2/2019 | Jones |
| 2019/0258600 | A1 | 8/2019 | Das Sharma |
| 2020/0132760 | A1 | 4/2020 | Froelich et al. |
| 2020/0249275 | A1 | 8/2020 | Froelich et al. |
| 2020/0364108 | A1 | 11/2020 | Froelich et al. |
| 2020/0364129 | A1 | 11/2020 | Das Sharma |
| 2021/0050941 | A1 | 2/2021 | Das Sharma |
| 2021/0376716 | A1 | 12/2021 | Liu |
| 2021/0390074 | A1 | 12/2021 | Park et al. |
| 2022/0022770 | A1 | 1/2022 | Ouwerkerk |
| 2022/0318094 | A1 | 10/2022 | Jeon et al. |
| 2022/0318180 | A1 | 10/2022 | Jeon et al. |

FOREIGN PATENT DOCUMENTS

| | | |
|---|---|---|
| CN | 1376959 A | 10/2002 |
| CN | 1395426 A | 2/2003 |
| CN | 1492684 A | 4/2004 |
| CN | 1910934 A | 2/2007 |
| CN | 104519354 A | 4/2015 |
| CN | 111262621 A | 6/2020 |
| CN | 111865338 A | 10/2020 |
| CN | 111930664 A | 11/2020 |
| CN | 113806262 B | 5/2024 |
| EP | 1049280 A2 | 11/2000 |
| JP | 2019192287 A | 10/2019 |
| KR | 101419292 B1 | 7/2014 |
| KR | 1020170124403 A | 11/2017 |
| KR | 10-2021-0155658 A | 12/2021 |
| KR | 102415309 B1 | 6/2022 |
| KR | 10-2022-0138245 A | 10/2022 |
| KR | 10-2022-0162377 A | 12/2022 |
| KR | 102507714 B1 | 3/2023 |

OTHER PUBLICATIONS

Mobin, M. et al, "PCIe Gen4 Standards Margin Assisted Outer Layer Equalization for Cross Lane Optimization in a 16GT/s PCIe Link", DesignCon 2017, 26 pages.
PCI Express Base Specification, Revision 4.0, Version 1.0, Sep. 27, 2017. PCI Express, 1293 pages.
Stumpf, M.F., "Analyzing the Real Jitter Performance of an SSC Clock." PCI SIG Developers Conference, 2018, 32 pages.
First Office Action for CN Appl. No. 202111220170.7, mailed on Jul. 26, 2025, 17 pages with English translation.
Request for the Submission of an Opinion for KR Appl. No. 10-2023-0153478, mailed on Sep. 22, 2025, 23 pages with English translation.

* cited by examiner

INTERFACE DEVICE AND METHOD OF OPERATING THE SAME

CROSS-REFERENCE TO RELATED APPLICATION

This patent document is a continuation of, and claims the priority and benefits of, U.S. patent application Ser. No. 17/840,340 filed on Jun. 14, 2022, which is a divisional of, and claims the priority and benefits of, U.S. patent application Ser. No. 17/349,775 filed on Jun. 16, 2021, which claims the priority and benefits of Korean patent application number 10-2020-0073157 filed on Jun. 16, 2020. The entire contents of the above applications are incorporated by reference as part of the disclosure of this patent document.

TECHNICAL FIELD

The embodiments of the disclosed technology relate to an electronic device, and more particularly, to an interface device and a method of operating the same.

BACKGROUND

Input/output interface provides a method for transferring information between two or more separate electronic components. Examples of the input/output interface include industry standard architecture (ISA), peripheral component interconnect (PCI), advanced graphics port (AGP), parallel advanced technology attachment (PATA), or serial advanced technology attachment (SATA). Recently, PCI express (PCIe) has been developed to replace the older bus standards. The PCIe has numerous improvements over the older standards, including higher bus bandwidth, less I/O pin number, smaller physical area and higher performance scalability.

SUMMARY

The embodiments of the disclosed technology provide an interface device capable of adaptively determining a transmission parameter based on a link characteristic.

In an embodiment of the disclosed technology, a method of operating an interface device including a first buffer and in communication with another interface device including a second buffer is provided. The method of operating the interface device includes initializing one or more parameters associated with clock signals for a data transmission or reception of the interface device, checking whether the interface device is in a predetermined mode for adjusting the one or more parameters, adjusting, upon determination that the interface device is in the predetermined mode, the one or more parameters associated with the clock signals of the interface device based on how much of the first buffer or the second buffer is filled with data, and performing the data transmission or reception based on the adjusted one or more parameters associated with the clock signals.

In an embodiment, adjusting the one or more parameters may include adjusting a clock frequency range of spread spectrum clocking scheme.

In an embodiment, adjusting the clock frequency range of the spread spectrum clocking scheme may include initializing the clock frequency range based on a fundamental frequency, adjusting the clock frequency range by a predetermined step value, performing the data transmission or reception based on the adjusted clock frequency range, and determining whether a pre-underflow or a pre-overflow is generated in at least one of the first buffer and the second buffer during the data transmission or reception.

In an embodiment, the method may further include selecting, upon determination that the pre-underflow or the pre-overflow is generated in the first buffer or the second buffer during the data transmission or reception, a currently applied clock frequency range as the clock frequency range of the spread spectrum clocking scheme.

In an embodiment, the method may further include re-adjusting, upon determination that neither the pre-underflow nor the pre-overflow is generated in at least one of the first buffer or the second buffer during the data transmission or reception, the clock frequency range by the step value, performing at least one of data transmission or reception based on the adjusted clock frequency range, and determining whether the pre-underflow or the pre-overflow is generated in at least one of the first buffer and the elastic buffer based on the data transmission or reception.

In an embodiment, adjusting the clock frequency range by the step value may include increasing the clock frequency range by the step value.

In an embodiment, adjusting the one or more parameters may include determining an interval for inserting a skip ordered-set into the transmission data.

In an embodiment, determining the interval for inserting the skip ordered-set into the transmission data may include initializing the interval for inserting the skip ordered-set, adjusting the interval by a predetermined step value, performing the data transmission or reception including the skip ordered-set based on the adjusted interval, and determining whether a pre-underflow or a pre-overflow is generated in at least one of the first buffer and the second buffer based on the data transmission or reception.

In an embodiment, the method may further include selecting, upon determination that the pre-underflow or the pre-overflow is generated in at least one of the first elastic buffer or the second elastic buffer, a current interval as the interval for inserting the skip ordered-set.

In an embodiment, adjusting the interval by the predetermined step value may include increasing the interval by the predetermined step value.

According to another embodiment of the disclosed technology a method of operating an interface device including a first buffer and in communication with another interface device including a second buffer is provided. The method of operating the interface device includes initializing one or more parameters associated with clock signals for a data transmission or reception of the interface device, adjusting the one or more parameters by a step value, performing at least one of transmission or reception of data to and from the other interface device communicating with the interface device based on the adjusted one or more parameters, and determining whether a pre-underflow or a pre-overflow is generated in at least one of the first buffer and a second buffer included in the other interface device based on the transmission and reception of the data.

In an embodiment, the method may further include selecting, upon determination that the pre-underflow or the pre-overflow is generated in at least one of the first buffer and the second buffer, the current one or more parameters as an optimal transmission parameter.

In an embodiment, the method may further include re-adjusting, upon determination that neither the pre-underflow nor the pre-overflow is generated in at least one of the first buffer or the second buffer during the data transmission or reception, the transmission parameter by the step value, performing at least one of transmission or reception of the data to and from the other interface device based on the adjusted one or more parameters, and determining whether the pre-underflow or the pre-overflow is generated in at least one of the first buffer or the second buffer based on the transmission or reception of the data.

In an embodiment, the one or more parameters may include a clock frequency range of spread spectrum clocking scheme.

In an embodiment, the one or more parameters may include an interval for inserting a skip ordered-set into the transmission data.

An interface device based on still another embodiment of the disclosed technology includes a receiver configured to receive data, a buffer in communication with the receiver and configured to store the received data, a buffer status monitor in communication with the buffer and configured to monitor a status of the buffer, a skip ordered-set generator configured to generate a skip ordered set to be inserted into transmission data, a transmitter in communication with the skip ordered-set generator and configured to output the transmission data and the skip ordered-set, a transmission clock generator configured to generate a transmission clock, and a spread spectrum clocking controller configured to control the transmission clock generator and control a clock frequency of a spread spectrum clocking scheme. The interface device determines at least one of a clock frequency range of the spread spectrum clocking scheme or an interval at which the skip ordered-set is generated, based on the status of the buffer and a status of another buffer included in another interface device communicating with the interface device.

In an embodiment, the buffer status monitor may transfer first status information indicating the status of the buffer to the spread spectrum clocking controller, the buffer may transfer second status information indicating the status of the other buffer included in the other interface device to the spread spectrum clocking controller, and the spread spectrum clocking controller may determine the clock frequency range of the spread spectrum clocking scheme based on the first status information and the second status information.

In an embodiment, the spread spectrum clocking controller may initialize the clock frequency range based on a fundamental frequency and adjust the clock frequency range by a step value, the transmitter may transmit data based on the adjusted clock frequency range, the receiver may receive data from the other interface device, and the spread spectrum clocking controller may determine whether a pre-underflow or a pre-overflow is generated in the first buffer or the second buffer based on the first status information and the second status information generated based on the transmission and reception of the data.

In an embodiment, the spread spectrum clocking controller may determine that a current clock frequency range as an optimal clock frequency range, when the pre-underflow or the pre-overflow is generated in the first buffer or the second buffer.

In an embodiment, when the pre-underflow or the pre-overflow is not generated in the first buffer or the second buffer, the spread spectrum clocking controller may re-adjust the clock frequency range by the step value, the transmitter may re-transmit data based on the re-adjusted clock frequency range, the receiver may re-receive data from the other interface device, and the spread spectrum clocking controller may determine whether the pre-underflow or the pre-overflow is generated in the first buffer or the second buffer based on the first status information and the second status information generated based on the transmission and reception of the data.

In an embodiment, the buffer status monitor may transfer first status information indicating the status of the buffer to the skip ordered-set generator, the buffer may transfer second status information indicating the status of the other buffer included in the other interface device to the skip ordered-set generator, and the skip ordered-set generator may determine an interval at which the skip OS is generated, based on the first status information and the second status information.

In an embodiment, the skip ordered-set generator may initialize the interval and adjust the interval by a step value, the transmitter may transmit data including the skip ordered-set generated based on the adjusted interval, the receiver may receive data from the other interface device, and the skip ordered-set generator may determine whether the pre-underflow or the pre-overflow is generated in the first buffer or the second buffer based on the first status information and the second status information generated based on the transmission and reception of the data.

In an embodiment, the skip ordered-set generator may select, upon determination that the pre-underflow or the pre-overflow is generated in the first buffer or the second buffer, a current interval as an optimal interval.

In an embodiment, upon determination that neither the pre-underflow nor the pre-overflow is generated in the first buffer or the second buffer, the skip ordered-set generator may re-adjust the interval by the step value, the transmitter may re-transmits data including the skip ordered-set generated based on the re-adjusted interval, the receiver may re-receive data from the other interface device, and the skip ordered-set generator may re-determine whether the pre-underflow or the pre-overflow is generated in the first buffer or the second buffer, based on the first status information and the second status information generated based on the transmission and reception of the data.

The present technology may provide an interface device capable of adaptively determining a transmission parameter according to a link characteristic.

DETAILED DESCRIPTION

Specific structural or functional descriptions of embodiments disclosed in the present specification or application are illustrated only to describe example embodiments of the disclosed technology. The embodiments of the disclosed technology may be implemented in various forms and the descriptions are not limited to the embodiments described in the present specification or application.

Figure 1:
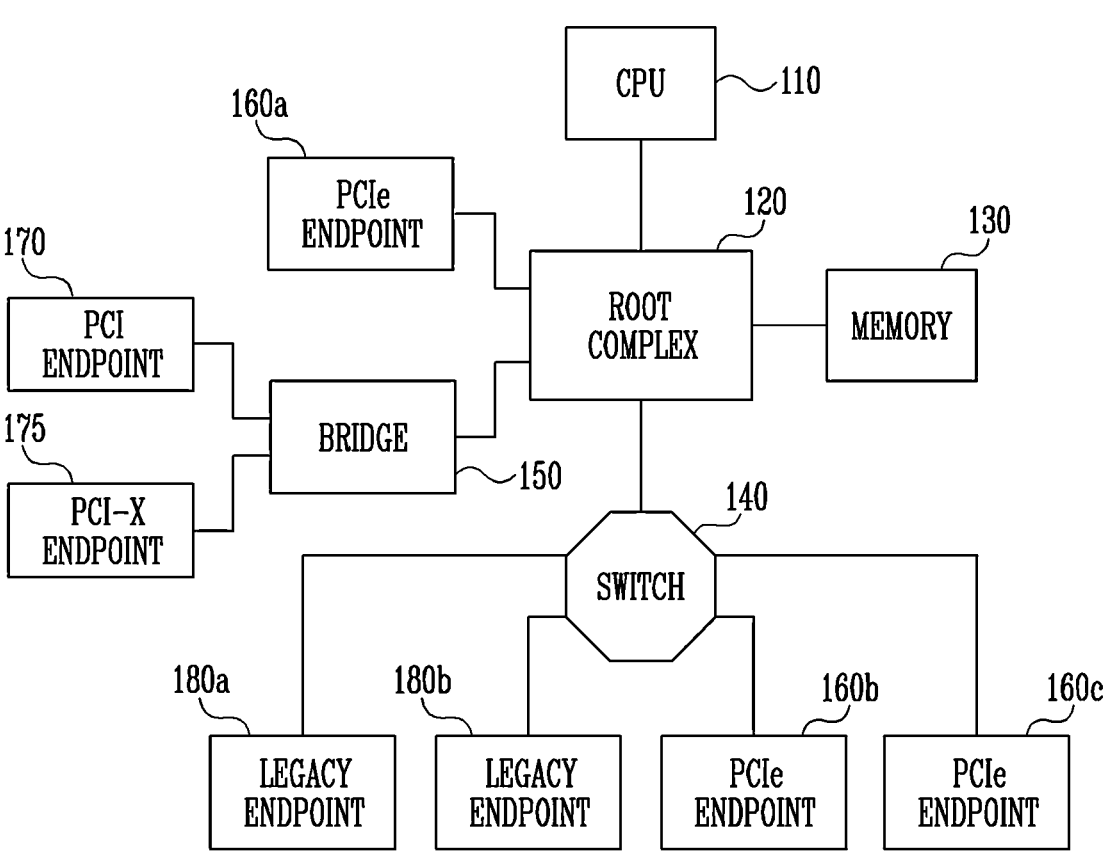
FIG. 1 is a diagram illustrating a fabric topology of interface devices.

FIG. 1 is a diagram illustrating a fabric topology of interface devices that shows a computing system including a plurality of input/output (I/O) hierarchies that connect interface devices.

Referring to FIG. 1, a CPU 110 and a memory 130 may be electrically or communicatively connected to a root complex 120. The CPU 110 may be a main processing unit of the computing system. The memory 130 may be a main memory of the computing system. In an embodiment, the memory 130 may include a random access memory (RAM).

In this patent document, the abbreviation "RC" is used to indicate the root complex 120. The root complex 120 serves to connect a sub system including the CPU 110 and the memory 130 to input/output interfaces. The root complex 120 may support one or more ports of one or more interface devices. The port may refer to a software and/or hardware part for connecting an interface device to a link. The port may include a transmitter and a receiver. The port may be divided into any one of an upstream port or a downstream port. The upstream port may be a port toward the root complex, and the downstream port may be a port toward an endpoint from the root complex. Therefore, the root complex 120 may include the downstream port and the endpoint may include the upstream port.

A hierarchy may refer to a network or fabric of all devices and links electrically or communicatively connected to the root complex 120. The hierarchy may be directly connected to the endpoints through the port or indirectly connected to the endpoints through a switch or a bridge. In FIG. 1, the endpoints 160*a*, 160*b*, 160*c*, 170, 175, 180*a*, and 180*b*, the switch 140, and the bridges 150 connected to the root complex 120 form one hierarchy. In some implementations, a hierarchy domain may include devices and links connected to one port of the root complex 120. For example, based on FIG. 1, the root complex 120 is connected to three hierarchy domains. A first hierarchy domain may include a PCIe endpoint 160*a*.

An endpoint includes a device that is used to carry out transactions, other than the root complex 120, the switch 140, and the bridge 150. In an embodiment, the endpoint may include peripheral devices such as Ethernet, a USB or a graphics device. The endpoint may initiate a transaction as a requester or respond to the transaction as a completer. The endpoint may be a device or a component positioned at the lowest position of an input/output hierarchy connected to the CPU 110 and the memory 130.

An input/output hierarchy domain connecting the interface devices to the root complex 120 may include at least one endpoint. As an example, the PCIe endpoint 160*a* of FIG. 1 may form an input/output hierarchy domain directly connected to the root complex 120. The PCI endpoint 170 and the PCI-X endpoint 175 may form an input/output hierarchy domain connected to the root complex 120 through the bridge 150. The legacy endpoints 180*a* and 180*b* and the PCIe endpoints 160*b* and 160*c* may form an input/output hierarchy domain connected to the root complex 120 through the switch 140.

The switch 140 is a device capable of connecting a plurality of endpoints to a single root port of the root complex 120. The switch 140 may include one upstream port and a plurality of downstream ports. In FIG. 1, the switch 140 has two legacy endpoints 180*a* and 180*b* and two PCIe endpoints 160*b* and 160*c* connected to the root complex 120 through the switch 140. In this case, the legacy endpoints 180*a* and 180*b* and the PCIe endpoints 160*b* and 160*c* may be connected to the downstream port of the switch 140. In some implementations, the root complex 120 may be connected to the upstream port of the switch 140.

The bridge 150 may connect a PCI or a PCI-X structure and a PCIe fabric.

The switch 140 or the bridge 150 may transfer a packet or a message through an upstream port, that is, from the endpoints 160*a*, 160*b*, 160*c*, 170, 175, 180*a*, and 180*b* to the root complex 120. In some implementations, the switch 140 or the bridge 150 may transfer the packet or the message through a downstream port, that is, from the root complex 120 to the endpoints 160*a*, 160*b*, 160*c*, 170, 175, 180*a*, and 180*b*.

The interface device based on embodiments of the disclosed technology may be any one of the root complex 120, the PCIe endpoints 160*a*, 160*b*, and 160*c*, the switch 140, and the bridge 150 shown in FIG. 1. The interface device based on an embodiment of the disclosed technology may adaptively determine a transmission parameter based on a status of an elastic buffer. Accordingly, data transmission efficiency of a link connecting the interface devices may be improved.

Figure 2:
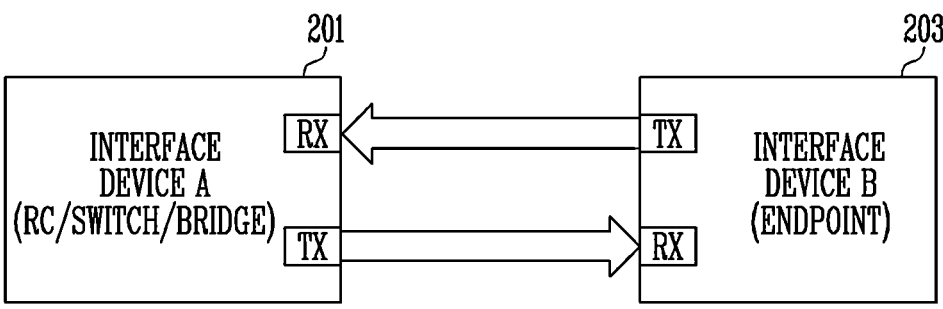
FIG. 2 is a diagram illustrating a link between the interface devices.

FIG. 2 is a diagram illustrating the link between the interface devices, showing a link between an interface device A 201 and an interface device B 203. One of the interface device A 201 and the interface device B 203 may be the root complex 120 of FIG. 1, and the other may be one of the end points 160*a*, 160*b*, 160*c*, 170, 175, 180*a*, and 180*b* of FIG. 1. In some implementations, as shown in FIG. 2, the interface device A 201 may be any one of a root complex RC, a switch, and a bridge. In addition, the interface device B 203 may be an endpoint. Each of the interface device A 201 and the interface device B 203 includes a transmitter TX and a receiver RX. Data may be transferred from the transmitter TX of the interface device A 201 to the receiver RX of the interface device B 203, and data may be transferred from the transmitter TX of the interface device B 203 to the receiver RX of the interface device A 201. When the interface devices A and B 201 and 203 are configured as a PCIe device, the link between the interface devices A and B 201 and 203 may be configured of x1, x2, x4, x8, x12, x16 or x32 point-to-point link. For example, the x1 point-to-point link may include one lane, and the x32 point-to-point link may include 32 lanes. The one lane may include two differential pairs with one transmission channel and one reception channel. Referring to FIG. 2, an embodiment in which the interface devices A and B 201 and 203 are connected by the x1 point-to-point link is shown. During a hardware initialization period, a link initialization operation may be performed. The interface devices A and B 201 and 203 may exchange a data packet through the link. A data bandwidth between the interface devices 201 and 203 may be extended by adding a lane.

Figure 3:
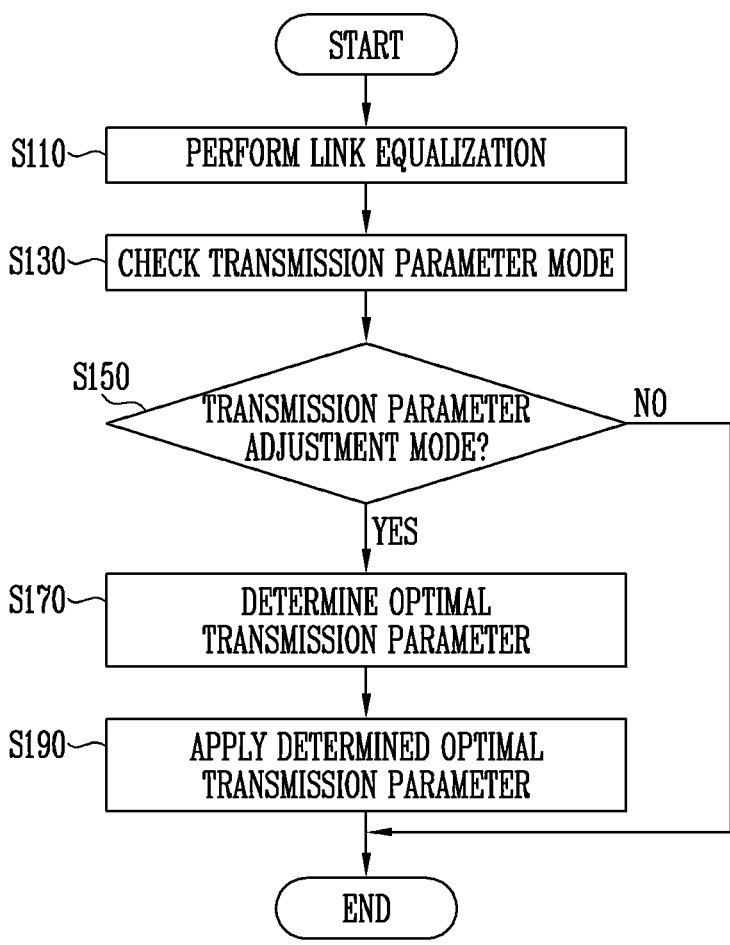
FIG. 3 is a flowchart illustrating a method of operating an interface device based on an embodiment of the disclosed technology.

FIG. 3 is a flowchart illustrating a method of operating an interface device based on an embodiment of the disclosed technology. More specifically, FIG. 3 shows a flowchart for performing a link initialization operation between interface devices based on an embodiment of the disclosed technology.

Referring to FIG. 3, a method of operating an interface device may include performing link equalization (S110), checking a transmission parameter mode (S130), when the transmission parameter mode is a transmission parameter adjustment mode (S150: Yes), determining an optimal transmission parameter (S170), and applying the determined optimal transmission parameter (S190). In the context of this patent document, the word "optimal" that is used in conjunction with certain parameters or ranges of values can be used to indicate values or conditions that provide a better performance for the devices discussed in this patent document. In this sense, the word "optimal" may or may not convey the best possible performance achievable by the devices.

At S110, the link equalization is performed. The link equalization is an operation of initializing various parameters related to a layer, a port, and a link of the interface device so that the link may perform a normal packet exchange from a time point when the device is powered on or from a time point when the interface device or a system including the interface device resets its parameters. The link equalization operation may be initiated by hardware, and may be managed by a link training & status state machine (LTSSM). In some implementations, the LTSSM may include 11 statuses (L0, L0s L1, L2, configuration, polling, detect, disabled, hot reset, loopback, and recovery). The link equalization may include phase 0 to phase 3. In the phase 0, data transmission starts at an initial speed, and a preset value for transmission speed conversion may be exchanged. In the phase 1, two interface devices connected to the link may share each other's equalization capability. In the phase 2, an upstream port may adjust a transmitter setting of a downstream port together with an own receiver setting. In the phase 3, the downstream port may adjust a transmitter setting of the upstream port together with an own receiver setting.

At S130, the interface device may check the transmission parameter mode. In an embodiment of the disclosed technology, the interface device may adaptively determine the transmission parameter or use a predetermined transmission parameter based on the transmission parameter mode.

At S150, it is determined whether the transmission parameter mode is the transmission parameter adjustment mode. When the transmission parameter mode is not the transmission parameter adjustment mode (S150: No), the interface device may use the predetermined transmission parameter, terminating the link initialization operation between the interface devices.

When the transmission parameter mode is the transmission parameter adjustment mode (S150: Yes), the interface device may adaptively determine the transmission parameter. Accordingly, the method proceeds to step S170 to determine an optimal transmission parameter.

At S170, the optimal transmission parameter is determined. As an example, in step S170, a clock frequency range used for spread spectrum clocking (SSC) may be determined. In the context of this patent document, the term "SSC range" can be used to indicate the clock frequency range used for spread spectrum clocking (SSC). In clock signals, the energy concentrates in a certain frequency and thus a potential electromagnetic interference (EMI) issue arises. The spread spectrum clocking (SSC) may reduce the radiated emissions of clock signals by varying the frequency of the clock signals such that the peak amplitude of the clock signals can be reduced by shifting the frequency. When transmitting and receiving data using the SSC, a characteristic against electromagnetic interference (EMI) may be improved. An EMI characteristic is improved as the SSC range becomes wide. In a typical case, an SSC range fixed in advance is set to perform an SSC operation based the SSC range, and when the SSC range is set to be excessively wide, transmission and reception performance may be deteriorated. In an interface device and a method of operating the interface device based on an embodiment of the disclosed technology, an optimal SSC range may be determined based on the link characteristic between the interface devices, rather than using a fixed SSC range. Accordingly, transmission and reception performance may be improved while maintaining an EMI characteristic at a certain desired level.

In another embodiment of the disclosed technology, at S170, an interval at which a skip ordered-set (skip OS) is inserted between transmission data may be determined. The transmitter TX of the interface device is configured to transmit data by periodically inserting the skip OS to prevent an overflow or an underflow from occurring in an elastic buffer of the receiver RX. An elastic buffer is a first-in-first-out (FIFO) buffer that can have different rates between the input and the output so as to elastically compensate for a difference in the input and output rates. When the elastic buffer of the receiver approaches an overflow status, the overflow may be reduced or minimized by preventing at least a portion of the received skip OS from being input to the elastic buffer. When the elastic buffer of the receiver approaches an underflow status, the underflow may be reduced or minimized by inputting the received skip OS to the elastic buffer. When the insertion interval of the skip OS is relatively short, the overflow or the underflow of the elastic buffer may not be generated, but data transmission efficiency is reduced. On the other hand, when the insertion interval of the skip OS is relatively long, the data transmission efficiency may be improved, but a possibility of the overflow or the underflow of the elastic buffer may be increased. In some implementations, a skip OS interval that is fixed in advance is set to perform data transmission based the skip OS interval, and when the skip OS interval is set to be excessively short, transmission and reception performance may be reduced. In an interface device and a method of operating the interface device based on an embodiment of the disclosed technology, an optimal skip OS interval may be determined based on the link characteristic between the interface devices, rather than using a fixed skip OS interval.

Accordingly, transmission and reception performance may be improved while maintaining an EMI characteristic at a certain desired level.

At S190, the determined optimal transmission parameter may be applied. Therefore, the link initialization operation may be completed.

Figure 4:
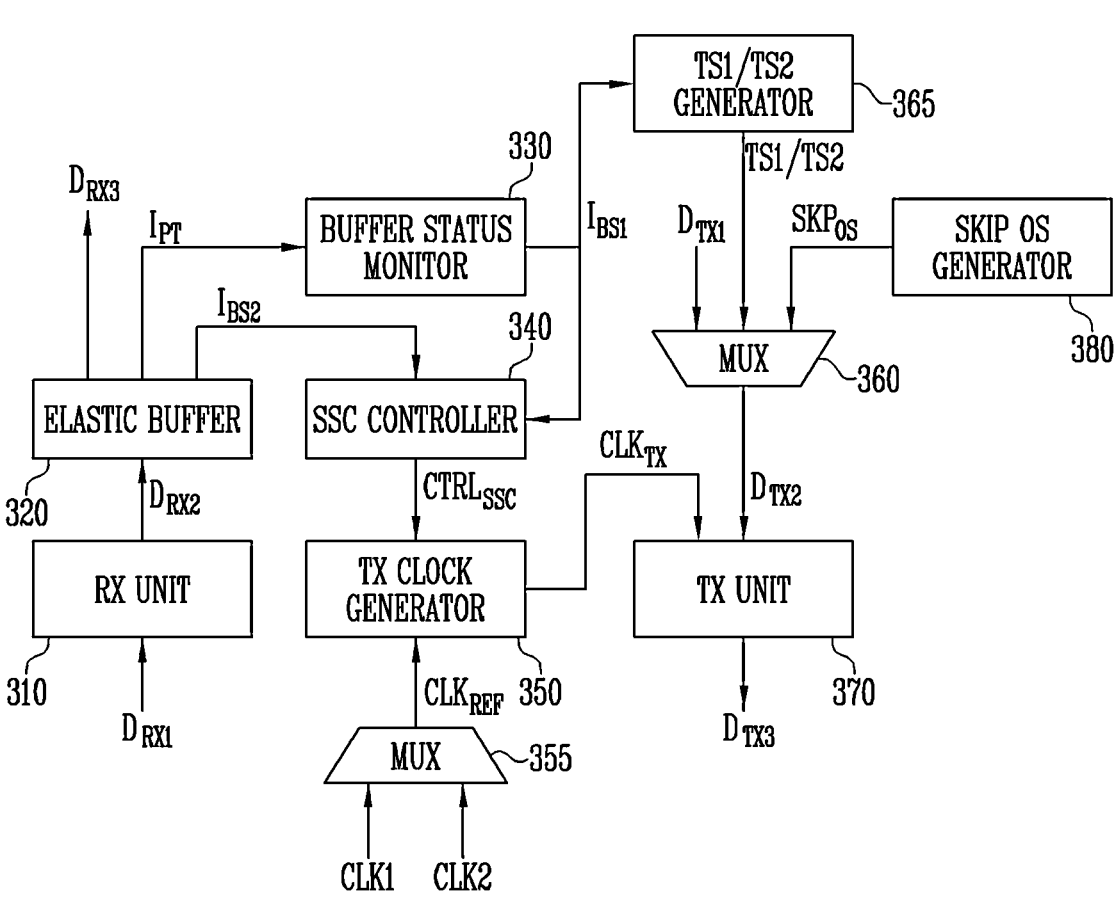
FIG. 4 is a block diagram illustrating an interface device 300a based on an embodiment of the disclosed technology.

FIG. 4 is a block diagram illustrating an interface device 300a based on an embodiment of the disclosed technology. Referring to FIG. 4, the interface device 300a may include a receiver 310, an elastic buffer 320, a buffer status monitor 330, an SSC controller 340, a transmission clock generator 350, and MUXes 355 and 360, TS1/TS2 generator 365, a transmitter 370, and a skip OS generator 380.

The receiver 310 receives data $D_{RX1}$ through a link. The receiver 310 may include a deserializer, a descrambler, a clock data recovery (CDR), and the like. The receiver 310 may generate and output data $D_{RX2}$ based on the data $D_{RX1}$. As an example, the data $D_{RX1}$ may be serial data, and the data $D_{RX2}$ may be parallel data.

The data $D_{RX2}$ may be transferred to the elastic buffer 320. The elastic buffer 320 may temporarily store the data $D_{RX2}$ and transfer data $D_{RX3}$ to an inner core (not shown) of the interface device 300a.

In some implementations, pointer information $I_{PT}$ of the elastic buffer 320 may be transferred to the buffer status monitor 330. The pointer information $I_{PT}$ of the elastic buffer 320 may be used to indicate a position of the last data in the elastic buffer 320 implemented in a FIFO form. A status of the elastic buffer 320 may be determined based on the pointer information $I_{PT}$, and thus first buffer status information $I_{BS1}$ may be generated. The first buffer status information $I_{BS1}$ is used to indicate the status of the elastic buffer 320 included in the interface device 300a. Determining the status of the elastic buffer 320 based on the pointer information $I_{PT}$ will be described later with reference to FIGS. 5A to 8C.

In some implementations, second buffer status information $I_{BS2}$ may be transferred from the elastic buffer 320 to the SSC controller 340. The second buffer status information $I_{BS2}$ may include information on an elastic buffer status of another interface device communicating with the interface device 300a. In this case, the second buffer status information $I_{BS2}$ may be received by the receiver 310 as the data $D_{RX1}$. For example, when the interface device 300a shown in FIG. 4 is the interface device A (201) of FIG. 2, the second buffer status information $I_{BS2}$ may include information on status of the elastic buffer included in the interface device B 203. In this case, the second buffer status information $I_{BS2}$ may be transferred from the transmitter TX of the interface device B 203 to the receiver RX of the interface device A.

The SSC controller 340 receives the first status information $I_{BS1}$ and the second status information $I_{BS2}$ to generate an SSC control signal $CTRL_{SSC}$. That is, the SSC controller 340 controls an SSC operation based on the first status information $I_{BS1}$ indicating the status of the elastic buffer 320 inside the interface device 300a and second status information $I_{BS2}$ indicating the status of the elastic buffer included in another external interface device. To this end, the SSC controller 340 generates the SSC control signal $CTRL_{SSC}$ for controlling the transmission clock generator 350.

In some implementations, the TS1/TS2 generator 365 may generate a TS1 ordered-set TS1 OS and a TS2 ordered-set TS2 OS based on the first status information $I_{BS1}$. The generated TS1 OS and the TS2 OS may be transferred to the MUX 360. The TS1 OS or the TS2 OS may be transferred to the other interface device, and an SSC range of a corresponding interface device may be adjusted.

The transmission clock generator 350 receives the SSC control signal $CTRL_{SSC}$ from the SSC controller 340. In addition, the transmission clock generator 350 receives a reference clock $CLK_{REF}$. The reference clock $CLK_{RE}$ may be received from the MUX 355. The MUX 355 may select any one of a first clock CLK1 and a second clock CLk2 and transfer the selected clock to the transmission clock generator 350 as the reference clock $CLK_{REF}$. As an example, the first clock CLK1 may be a reference clock received from the outside of the interface device 300a. In this case, the first clock CLK1 may be a 100 MHz reference clock received from the host. As an example, the second clock CLK2 may be a reference clock generated from an internal clock generator (not shown) of the interface device 300a. In this case, the second clock CLK2 may be an internal reference clock used for a separate reference clock with independent SSC (SRIS) mode or a separate reference clock with no SSC (SRNS) mode. The transmission clock generator 350 may generate a transmission clock $CLK_{TX}$ in which a spectrum is spread based on the reference clock $CLK_{REF}$, based on the SSC control signal $CTRL_{SSC}$. At this time, an SSC range of the transmission clock $CLK_{TX}$ may be determined by the SSC controller 340. The transmission clock $CLK_{TX}$ may be transferred to the transmitter 370.

In some implementations, the buffer status monitor 330 may transfer the first buffer status information $I_{BS1}$ to the MUX 360. The MUX 360 may receive the data $D_{TX1}$ from the inner core (not shown) of the interface device 300a in addition to the first buffer status information $I_{BS1}$. In addition, the MUX 360 may receive the skip OS $SKP_{OS}$ from the skip OS generator 380. In addition, the MUX 360 may receive the TS1 OS or the TS2 OS from the TS1/TS2 generator 365. The MUX 360 may multiplex the first buffer status information $I_{BS1}$, the data $D_{TX1}$, the TS1 OS, the TS2 OS, and the skip OS $SKP_{OS}$ and transmit the data $D_{TX2}$ to the transmitter 370. That is, as well as the data $D_{TX1}$ transferred from the inner core, the first buffer status information $I_{BS1}$ received from the buffer status monitor 330, the TS1 OS or the TS2 OS received from the TS1/TS2 generator 365, the skip OS $SKP_{OS}$ received from the skip OS generator 380 may also be transferred to the transmitter 370 as the data $D_{TX2}$.

The transmitter 370 may receive the data $D_{TX2}$ and the transmission clock $CLK_{TX}$ and generate the data $D_{TX3}$ based on the data $D_{TX2}$ and the transmission clock $CLK_{TX}$. The transmitter 370 may include a serializer, a scrambler, and the like. As an example, the data $D_{TX2}$ may be parallel data, and the data $D_{TX3}$ may be serial data output based on the transmission clock $CLK_{TX}$. The generated data $D_{TX3}$ may be transferred to the other interface device connected through the link.

As described above, the interface device 330a based on an embodiment of the disclosed technology may determine the SSC range based on the first buffer status information $I_{BS1}$ indicating the status of own elastic buffer or the second buffer status information $I_{BS2}$ indicating the status included in the other interface device 330a connected through the link. Accordingly, the SSC range used for data transmission and reception may be adaptively determined based on a link characteristic.

FIGS. 5A to 5J are diagrams illustrating an operation and the status of the elastic buffer. FIGS. 5A to 5J schematically show storage areas of the elastic buffer 320 implemented as a FIFO buffer.

In FIGS. 5A to 5J, an empty area and an area in which a data symbol is stored are distinguished and displayed among a plurality of areas in the elastic buffer 320. That is, the area in which the data symbol is stored in the elastic buffer 320 is shown as a hatched area.

Figures 5A, 5B, 5C, 5D, 5E, 5F, 5G, 5H, 5I, 5J:
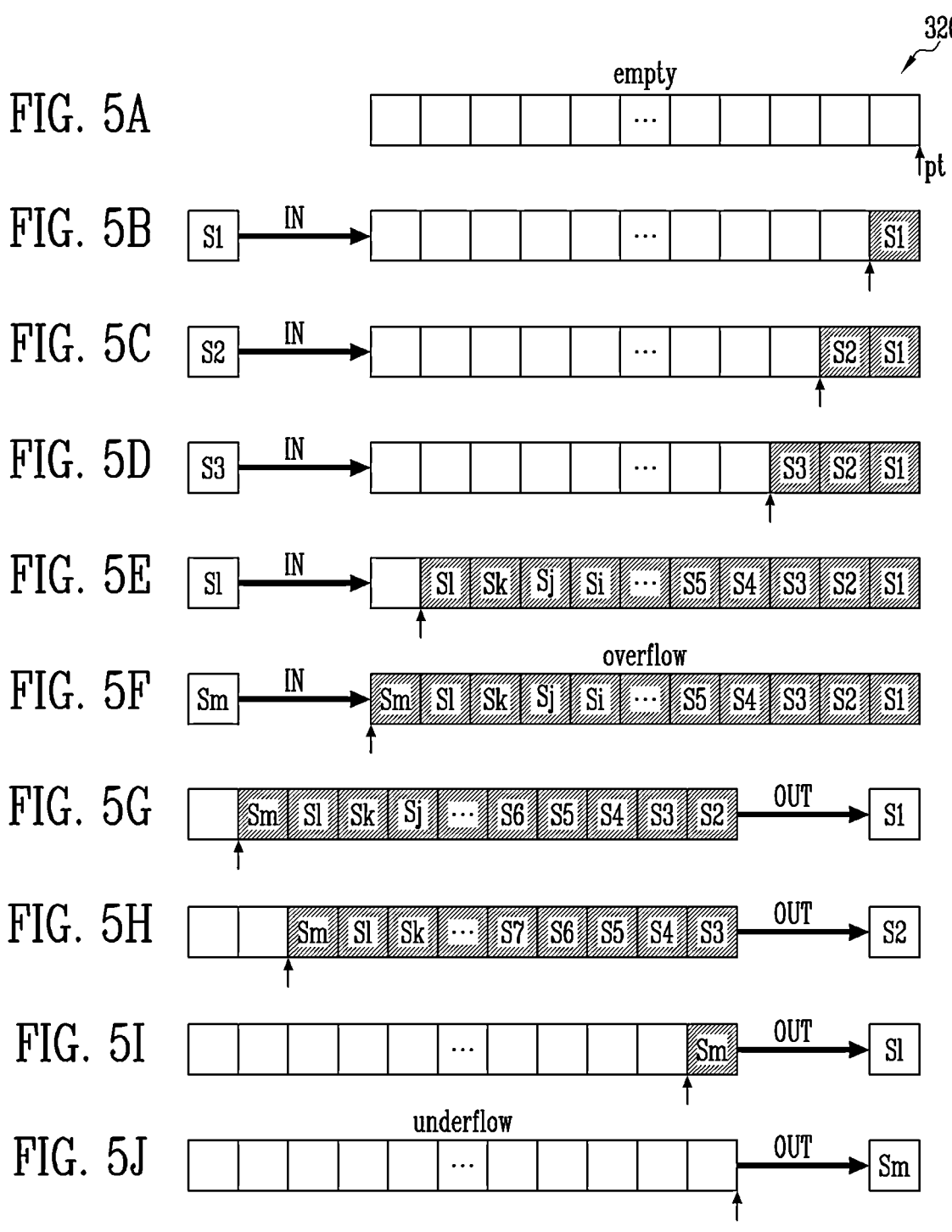
FIGS. 5A to 5J are diagrams illustrating an operation and a status of an elastic buffer.

Referring to FIG. 5A, the elastic buffer 320 of an empty status is schematically shown. In this case, a pointer pt of the elastic buffer may indicate the rightmost position of the elastic buffer.

In FIGS. 5B to 5F, a situation in which the data symbol is successively input to the elastic buffer 320 is shown. Input and output are performed in real time in the elastic buffer 320. However, for convenience of discussion, in FIGS. 5B to 5F, the elastic buffer of a case where only the input is performed without the output of the data symbol is shown.

Referring to FIG. 5B, a first symbol S1 configuring data is input to the elastic buffer 320. The input first symbol S1 may be stored to the rightmost side of the plurality of areas of the elastic buffer 320. As the first symbol S1 is stored, the pointer pt of the elastic buffer may indicate a position moved from the rightmost position of the elastic buffer to the left by one section.

Referring to FIG. 5C, a second symbol S2 configuring the data is input to the elastic buffer 320. The input second symbol S2 may be stored in a left area of the first symbol S1 which is first input among the plurality of areas of the elastic buffer 320. As the second symbol S2 is stored, the pointer pt of the elastic buffer may indicate a position moved from the previously indicated position to the left by one section.

Referring to FIG. 5D, a third symbol S3 configuring the data is input to the elastic buffer 320. The input third symbol S3 may be stored in a left area of the second symbol S2 which is first input among the plurality of areas of the elastic buffer 320. As the third symbol S3 is stored, the pointer pt of the elastic buffer may indicate a position moved from the previously indicated position to the left by one section.

In such a method, when the data symbols are successively input, symbols may be sequentially stored in the areas of the elastic buffer 320. Referring to FIG. 5E, an I-th symbol SI configuring the data is input to the elastic buffer 320. The input I-th symbol SI may be stored in a left area of a k-th symbol Sk which is first input among the plurality of areas of the elastic buffer 320. As the I-th symbol SI is stored, the pointer pt of the elastic buffer may indicate a position moved from the previously indicated position to the left by one section.

Referring to FIG. 5F, an m-th symbol Sm configuring the data is input to the elastic buffer 320. The input m-th symbol SI may be stored in a left area of the I-th symbol SI which is first input among the plurality of areas of the elastic buffer 320. As the m-th symbol Sm is stored, the pointer pt of the elastic buffer may indicate a position moved from the previously indicated position to the left by one section.

In FIG. 5F, the data symbols are stored in all areas of the elastic buffer 320. Accordingly, the elastic buffer 320 is in an overflow status, and the pointer pt of the elastic buffer may indicate the leftmost position of the elastic buffer.

In FIGS. 5B to 5F, an overflow of the elastic buffer that occurs when only the input is performed without the output of the data symbol is shown. However, even though the output and the input of the data symbol are performed together, the overflow of the elastic buffer may occur even in a case where an input frequency of the data symbol is greater than an output frequency.

In FIGS. 5G to 5J, a situation in which the data symbols are successively output from the elastic buffer 320 is shown. Referring to FIG. 5G, the symbol S1 which is first input among the data symbols stored in the elastic buffer 320 is output. As the first symbol S1 is output, storage positions of the second to m-th symbols may be moved to the right by one section, respectively. As the first symbol S1 is output, the pointer pt of the elastic buffer may indicate a position moved from the leftmost position of the elastic buffer to the right by one section.

Referring to FIG. 5H, the symbol S2 which is first input among the data symbols stored in the elastic buffer 320 is output. As the second symbol S2 is output, storage positions of the third to m-th symbols may be moved to the right by one section, respectively. As the second symbol S2 is output, the pointer pt of the elastic buffer may indicate a position moved from the previously indicated position to the right by one section. In such a method, when the data symbols are successively output, the storage positions of the data symbols stored in the elastic buffer 320 may be moved to the right by one section.

Referring to FIG. 5I, the I-th symbol SI among the data symbols stored in the elastic buffer 320 is output. As the I-th symbol SI is output, the storage position of the m-th symbol may be moved to the right by one section. As the I-th symbol SI is output, the pointer pt of the elastic buffer may indicate a position moved from the previously indicated position to the right by one section.

Finally, referring to FIG. 5J, the m-th symbol Sm, which is the last symbol among the data symbols stored in the elastic buffer 320, is output. As the m-th symbol Sm is output and all areas of the elastic buffer 320 are empty, the elastic buffer 320 is in an underflow status. In some implementations, the pointer pt may indicate the rightmost position of the elastic buffer 320.

FIGS. 5G to 5J show the underflow of the elastic buffer, which occurs when only the output is performed without the input of the data symbol. However, even though the output and the input of the data symbol are performed together, the underflow of the elastic buffer may occur even in a case where the output frequency of the data symbol is greater than the input frequency.

Figure 6A:
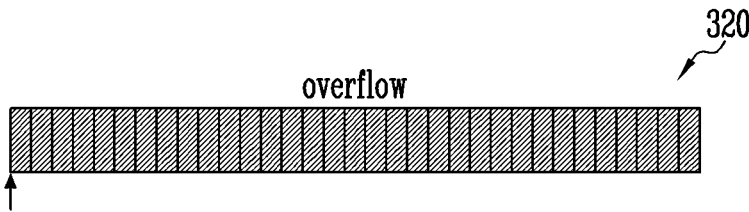
FIG. 6A illustrates an example of an overflow of the elastic buffer and FIG. 6B illustrates an example of an underflow of the elastic buffer.
Figure 6B:
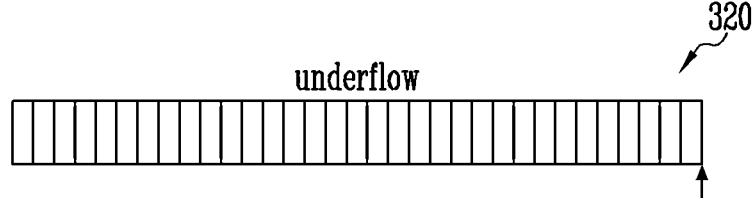

FIG. 6A illustrates an example of the overflow of the elastic buffer and FIG. 6B illustrates an example of the underflow of the elastic buffer. As described above, when all data symbols are stored in the plurality of areas of the elastic buffer 320, the elastic buffer 320 is in the overflow status. Referring to FIG. 6A, when the elastic buffer 320 is in the overflow status, the pointer indicates the leftmost position of the elastic buffer 320.

In some implementations, when no data symbol is stored in the plurality of areas of the elastic buffer 320, the elastic buffer 320 is in the underflow status. Referring to FIG. 6B, when the elastic buffer 320 is in the underflow status, the pointer indicates the rightmost position of the elastic buffer 320.

As shown in FIGS. 6A and 6B, it may be determined whether the elastic buffer 320 is currently in the overflow status, the underflow status, or a normal status, based on a position indicated by the pointer of the elastic buffer 320.

Figure 7:
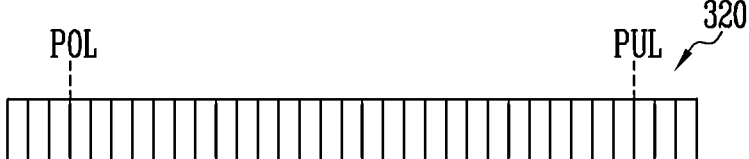
FIG. 7 is a diagram illustrating a pre-overflow limit and a pre-underflow limit of the elastic buffer.

FIG. 7 is a diagram illustrating a pre-overflow limit (POL) and a pre-underflow limit (PUL) of the elastic buffer. Based on an embodiment of the disclosed technology, in addition to the overflow and underflow statuses of the elastic buffer 320, pre-overflow and pre-underflow statuses may be defined. The pre-overflow status may mean that the elastic buffer 320 is currently close to the overflow status. The pre-underflow status may mean that the elastic buffer 320 is currently close to the underflow status. Based on an embodiment of the disclosed technology, the pre-overflow limit POL may be determined in advance to define the pre-overflow status of the elastic buffer 320. In some implementations, based on an embodiment of the disclosed technology, the pre-underflow limit PUL may be determined in advance to define the pre-underflow status of the elastic buffer 320.

Figure 8A:
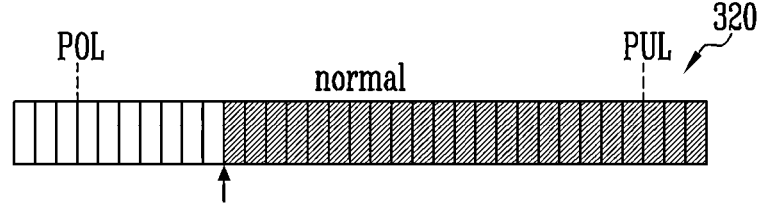
FIG. 8A illustrates an example of a normal status of the elastic buffer.
Figure 8B:
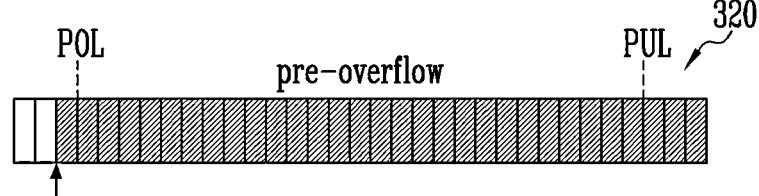
FIG. 8B illustrates an example of a pre-overflow status of the elastic buffer.
Figure 8C:
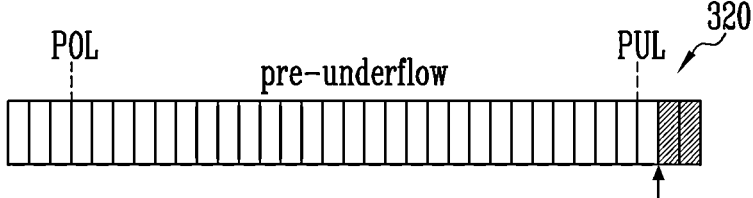
FIG. 8C illustrates an example of a pre-underflow status of the elastic buffer.

FIG. 8A illustrates an example of the normal status of the elastic buffer, FIG. 8B illustrates an example of the pre-overflow status of the elastic buffer, and FIG. 8C illustrates an example of the pre-underflow status of the elastic buffer.

Referring to FIG. 8a, the elastic buffer 320 of the normal status is shown. When the position of the pointer indicating the area in which the last data symbol is stored in the elastic buffer 320 is between the pre-overflow limit POL and the pre-underflow limit PUL, the current status of the elastic buffer 320 becomes the normal status.

Referring to FIG. 8B, the elastic buffer 320 of the pre-overflow status is shown. When the position of the pointer indicating the area in which the last data symbol is stored in the elastic buffer 320 is present at the pre-overflow limit POL or to the left of the pre-overflow limit POL, the current status of the elastic buffer 320 becomes the pre-overflow status. When the data symbol is continuously stored and the position of the pointer reaches the leftmost side of the elastic buffer 320 in the pre-overflow status, the status of the elastic buffer 320 may be switched from the pre-overflow status to the overflow status.

Referring to FIG. 8C, the elastic buffer 320 of the pre-underflow status is shown. When the position of the pointer indicating the area in which the last data symbol is stored in the elastic buffer 320 is present at the pre-underflow limit PUL or to the right of the pre-underflow limit PUL, the current status of the elastic buffer 320 becomes the pre-underflow status. When the data symbol is continuously output and the position of the pointer reaches the rightmost side of the elastic buffer 320 in the pre-underflow status, the status of the elastic buffer 320 may be switched from the pre-underflow status to the underflow status.

As described with reference to FIGS. 6A to 8C, the current status of the elastic buffer 320 may be determined by referring to the position of the pointer indicating the area in which the last data symbol is stored in the elastic buffer 320. That is, based on the position indicated by the pointer in the elastic buffer 320, the elastic buffer 320 is determined as any one of the overflow status, the pre-overflow status, the normal status, the pre-underflow status, and the underflow status.

Figure 9:
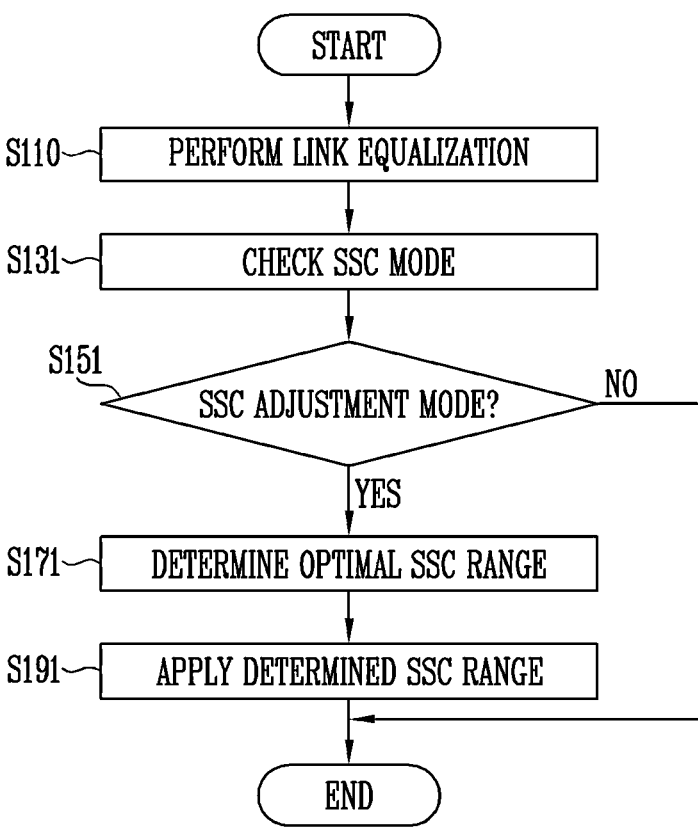
FIG. 9 is a flowchart illustrating a method of operating an interface device based on an embodiment of the disclosed technology.

FIG. 9 is a flowchart illustrating a method of operating an interface device based on an embodiment of the disclosed technology. More specifically, FIG. 9 shows a flowchart for performing a link initialization operation between interface devices based on an embodiment of the disclosed technology.

Referring to FIG. 9, a method of operating an interface device may include performing link equalization (S110), checking an SSC mode (S131), when the SSC mode is an SSC adjustment mode (S151: Yes), determining an optimal SSC range (S171), and applying the determined SSC range (S191).

In step S110, the link equalization is performed. Step S110 of FIG. 9 may be substantially the same as step S110 of FIG. 3. Therefore, repetitive description is omitted.

At S131, the interface device may check the SSC mode. Based on an embodiment of the disclosed technology, the interface device may adaptively determine the SSC range or use a predetermined SSC range based on the SSC mode.

At S151, it is determined whether the SSC mode is the "SSC adjustment mode". When the SSC mode is not the "SSC adjustment mode" (S151: No), the interface device may use the predetermined SSC range. Accordingly, the link initialization operation between the interface devices is ended.

When the SSC mode is the "SSC adjustment mode" (S151: Yes), the interface device may adaptively determine the SSC range. Accordingly, the method proceeds to step S171 to determine the optimal SSC range.

At S171, the optimal SSC range is determined. More specifically, in step S171, a clock frequency range used for spread spectrum clocking (SSC), that is, an "SSC range" may be determined. In an interface device and a method of operating the same based on an embodiment of the disclosed technology, the optimal SSC range may be determined based on the characteristics of the link between the interface devices, rather than using a fixed SSC range. Accordingly, transmission and reception performance may be improved while maintaining an EMI characteristic at a certain desired level. A detailed method of determining the optimal SSC range will be described later with reference to FIGS. 10 to 13.

At S191, the determined SSC range may be applied. Therefore, the link initialization operation may be completed. In a subsequent data transmission and reception operation, the interface device may apply the determined SSC range to the spread spectrum clocking.

Figure 10:
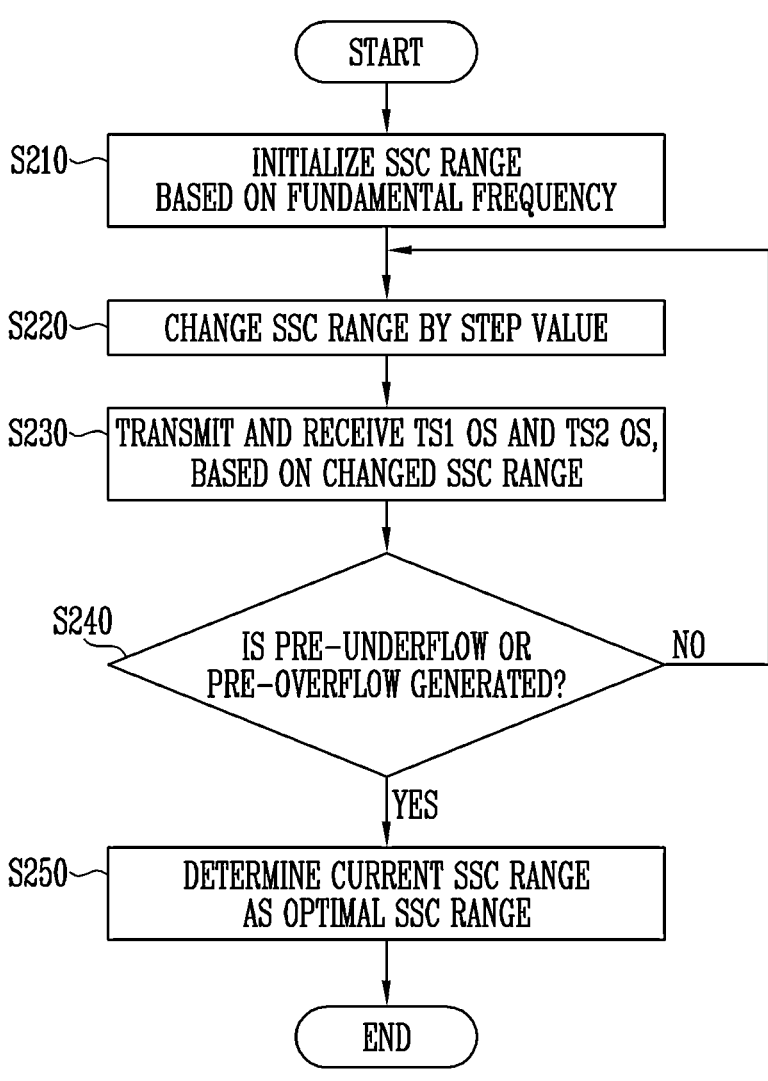
FIG. 10 is a flowchart illustrating an example of step S171 of FIG. 9.

FIG. 10 is a flowchart illustrating an example of step S171 of FIG. 9. Referring to FIG. 10, in order to determine the optimal SSC range, the interface device first initializes the SSC range based on a fundamental frequency (S210). In step S210, the initialized SSC range may correspond to a relatively narrow frequency range. The fundamental frequency may be used as a reference to determine whether to apply the SSC and/or which SSC range is applied. When the SSC is implemented in a down-spreading method, the fundamental frequency may be an upper limit of the SSC range. When the SSC is implemented in a center-spreading method, the fundamental frequency may be a median value of the SSC range. When SSC is implemented in an up-spreading method, the fundamental frequency may be a lower limit of the SSC range.

At S210, the SSC range is adjusted by a step value. In an embodiment, in step S210, the SSC range may be widened by the step value. Thereafter, in step S230, the interface device 300a may transmit and receive the TS1 ordered-set TS1 OS and the TS2 ordered-set TS2 OS based on the adjusted SSC range. That is, the interface device 300a may transmit and receive the TS1 ordered-set TS1 OS and the TS2 ordered-set TS2 OS to and from the other interface device based on the adjusted SSC range.

In a process of transmitting and receiving the TS1 ordered-set TS1 OS and the TS2 ordered-set TS2 OS, the interface device 300a determines whether the pre-underflow or the pre-overflow is generated in the elastic buffer 320 of the interface device 300a or the elastic buffer of the other interface device.

Whether the pre-underflow or the pre-overflow is generated in the elastic buffer 320 of the interface device 300a may be determined by the buffer status monitor 330 shown in FIG. 4. The buffer status monitor 330 receives the pointer information $I_{PT}$ of the elastic buffer 320 and determines the current status of the elastic buffer 320 based on the pointer information $I_{PT}$. As described with reference to FIGS. 6A to 8C, the buffer status monitor 330 may determine whether the elastic buffer 320 is currently in the normal status, the pre-overflow status, the pre-underflow status, the overflow status, or the underflow status based on the position indicated by the pointer of the elastic buffer 320. When the pre-overflow or the pre-underflow is generated in the elastic buffer 320, the buffer status monitor may generate the first buffer status information $I_{BS1}$ indicating that the pre-overflow or the pre-underflow is generated and transfer the first buffer status information $I_{BS1}$ to the SSC controller 340.

Whether the pre-underflow or the pre-overflow is generated in the elastic buffer of the other interface device communicating with the interface device 300a through the link may be determined through the second buffer status information $I_{BS2}$. When the pre-underflow or the pre-overflow is generated in the elastic buffer of the other interface device, the corresponding interface device may transfer information indicating that the pre-overflow or the pre-underflow is generated to the interface device 300a as the data $D_{RX1}$. The data $D_{RX1}$ is converted to the data $D_{RX2}$ by the receiver 310 and transferred to the elastic buffer 320. Among the data $D_{RX2}$, the second buffer status information $I_{BS2}$ indicating that the pre-underflow or the pre-overflow is generated in the elastic buffer of the other interface device may be extracted and transferred to the SSC controller 340.

Therefore, the SSC controller 340 may determine whether the pre-overflow or the pre-underflow is generated in the elastic buffer 320 based on the first buffer status information $I_{BS1}$. In some implementations, the SSC controller 340 may determine whether the pre-overflow or the pre-underflow is generated in the elastic buffer of the other interface device connected to the interface device 300a based on the second buffer status information $I_{BS2}$.

When the pre-underflow or the pre-overflow is not generated in the elastic buffer 320 of the interface device 300a or the elastic buffer of the other interface device (S240: No), the method returns to step S220 to re-adjust the SSC range by the step value. Thereafter, the interface device 300a may transmit and receive the TS1 ordered-set TS1 OS and the TS2 ordered-set TS2 OS based on the adjusted SSC range (S230). Steps S220, S230, and S240 are repeated until the pre-underflow or the pre-overflow is generated in the elastic buffer 320 of the interface device 300a or the elastic buffer of the other interface device.

When the pre-underflow or the pre-overflow is generated in the elastic buffer 320 of the interface device 300a or the elastic buffer of the other interface device (S240: Yes), the current SSC range is determined as the optimal SSC range. Accordingly, in accordance with the interface device and the method of operating the same based on an embodiment of the disclosed technology, the optimal SSC range may be determined by adaptively changing the SSC range until the pre-overflow or the pre-underflow is generated.

Figure 11:
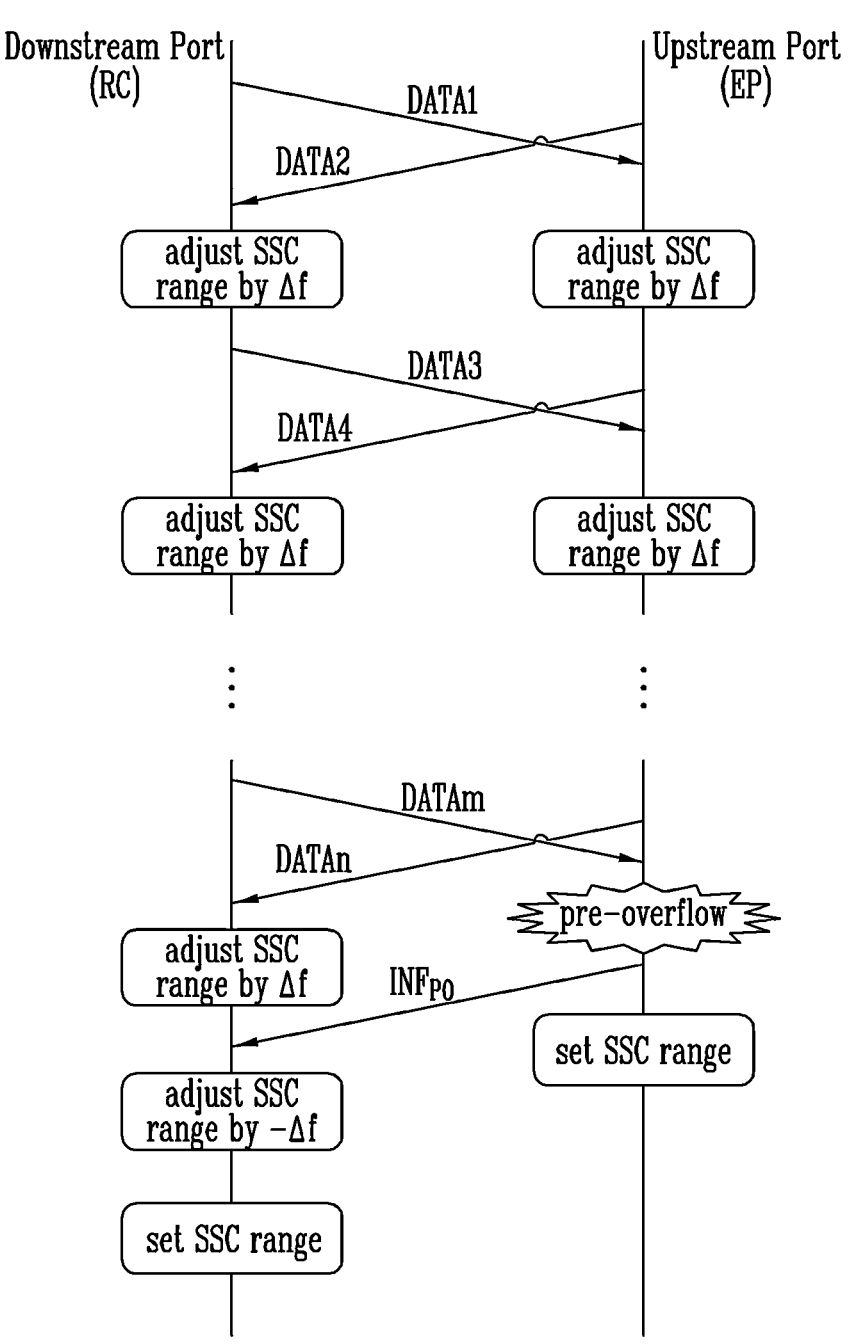
FIG. 11 is a ladder diagram showing an example of steps shown in FIG. 10.

FIG. 11 is a ladder diagram showing an example of the steps shown in FIG. 10. Referring to FIG. 11, data transmission and reception between a downstream port and an upstream port is shown. As an example, the downstream port may be the root complex RC. In some implementations, the upstream port may be the endpoint EP. Hereinafter, description will be given with reference to FIGS. 10 and 11 together.

First data DATA1 is transmitted from the downstream port to the upstream port, and second data DATA2 is transmitted from the upstream port to the downstream port (S230). Each of the first data DATA1 and the second data DATA2 may include at least one of the TS1 ordered-set TS1 OS and the TS2 ordered-set TS2 OS.

Each of the root complex RC and the end point EP determines whether the pre-underflow or the pre-overflow is generated (S240). Since the pre-underflow or the pre-overflow is not generated, the SSC range is adjusted by a step value $\Delta f$ (S220). Based on the adjusted SSC range, third data DATA3 is transmitted from the downstream port to the upstream port, and fourth data DATA4 is transmitted from the upstream port to the downstream port (S230). Thereafter, each of the root complex RC and the end point EP determines whether the pre-underflow or the pre-overflow is generated (S240). Since the pre-underflow or the pre-overflow is not generated, the SSC range is adjusted by the step value $\Delta f$ (S220). Such processes are repeated until the pre-underflow or the pre-overflow is generated.

In some implementations, m-th data DATAm is transmitted from the downstream port to the upstream port, and n-th data DATAn is transmitted from the upstream port to the downstream port (S230).

In a case of the root complex RC, the pre-overflow or the pre-underflow is not generated in its elastic buffer while receiving the n-th data DATAn. Therefore, the SSC range may be adjusted by the step value $\Delta f$ (S220). On the other hand, in a case of the end point EP, the pre-overflow is generated in the elastic buffer as the m-th data DATAm is received. Therefore, the endpoint EP determines the current SSC range as the optimal SSC range. The determined optimal SSC range may be set as the SSC range to be used for data communication later.

As the pre-overflow is generated in the elastic buffer of the endpoint EP, the endpoint EP transfers pre-overflow information $INF_{PO}$ indicating that the pre-overflow is generated in its elastic buffer to the root complex RC. As the root complex RC receives the pre-overflow information $INF_{PO}$, the root complex RC may adjust the SSC range by a minus step value $-\Delta f$. This is to correct that the root complex RC adjusts the SSC range by the step value $\Delta f$ immediately before to match with the SSC range of the endpoint. Thereafter, the root complex RC determines the current SSC range as the optimal SSC range.

Figure 12:
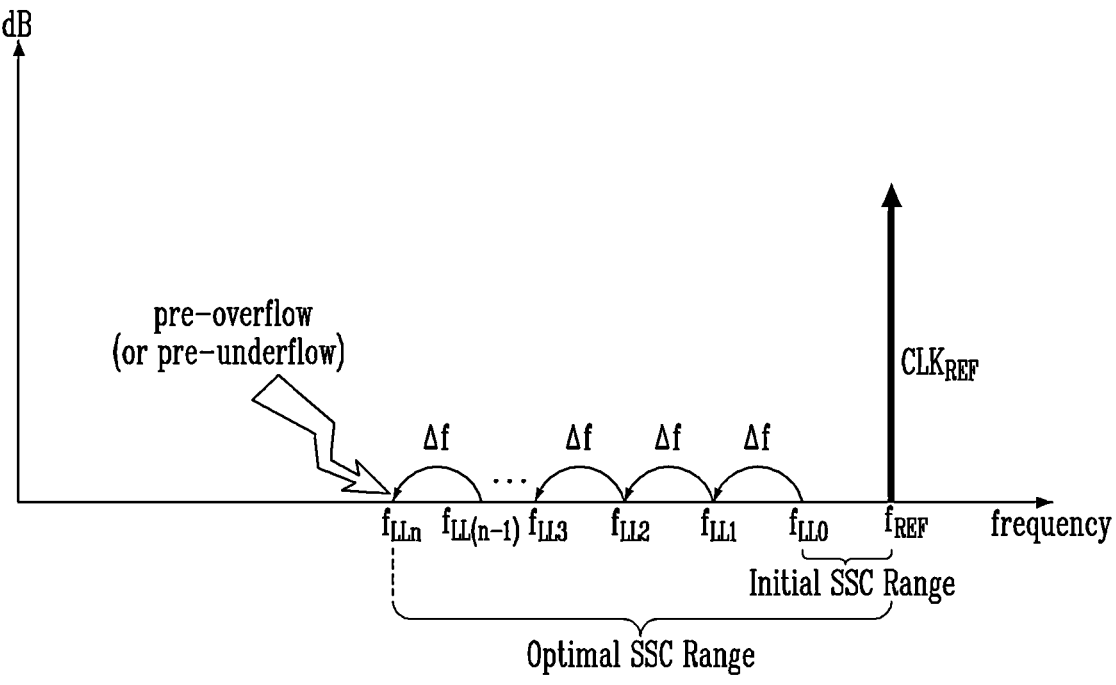
FIG. 12 is a graph showing the steps shown in FIG. 10.

FIG. 12 is a graph showing the steps shown in FIG. 10. In FIG. 12, the SSC range of the down-spreading method is shown. Referring to FIG. 12, a basic clock $CLK_{REF}$ having a fundamental frequency $f_{REF}$ is shown. In some implementations, an initial lower limit frequency $f_{LL0}$ indicating a lower limit of an initial SSC range is shown. In step S210 of FIG. 10, the SSC range is initialized based on the fundamental frequency $f_{REF}$ and the initial lower limit frequency $f_{LL0}$. The initial SSC range may be defined as a section $[f_{LL0}, f_{REF}]$.

By step S220, the SSC range is adjusted by the step value $\Delta f$. Referring to FIG. 12, a first lower limit frequency $f_{LL1}$ of a position spaced by the step value $\Delta f$ in a negative direction from the initial lower limit frequency $f_{LL0}$ becomes a lower limit of an adjusted SSC range. Accordingly, the adjusted SSC range may correspond to a section $[f_{LL1}, f_{REF}]$. When the pre-overflow or the pre-underflow is not generated (S240: No) as a result of transmitting and receiving data based on the adjusted SSC range $[f_{LL1}, f_{REF}]$, the SSC range is adjusted again by the step value $\Delta f$. Accordingly, the SSC range is changed to a section $[f_{LL2}, f_{REF}]$. Such processes are repeated until the pre-overflow or the pre-underflow is generated in the elastic buffer of the root complex RC or the endpoint EP.

As a result of repeatedly adjusting the SSC range n times by the step value $\Delta f$, data transmission and reception may be performed based on the adjusted SSC range $[f_{LLn}, f_{REF}]$ (S230). FIG. 12 shows a situation in which the pre-overflow or the pre-underflow is generated as a result of performing the data transmission and reception (S230) based on the section $[f_{LLn}, f_{REF}]$ which is the adjusted SSC range. Accordingly, the section $[f_{LLn}, f_{REF}]$ that is the current SSC range may be determined as the optimal SSC range.

Figure 13:
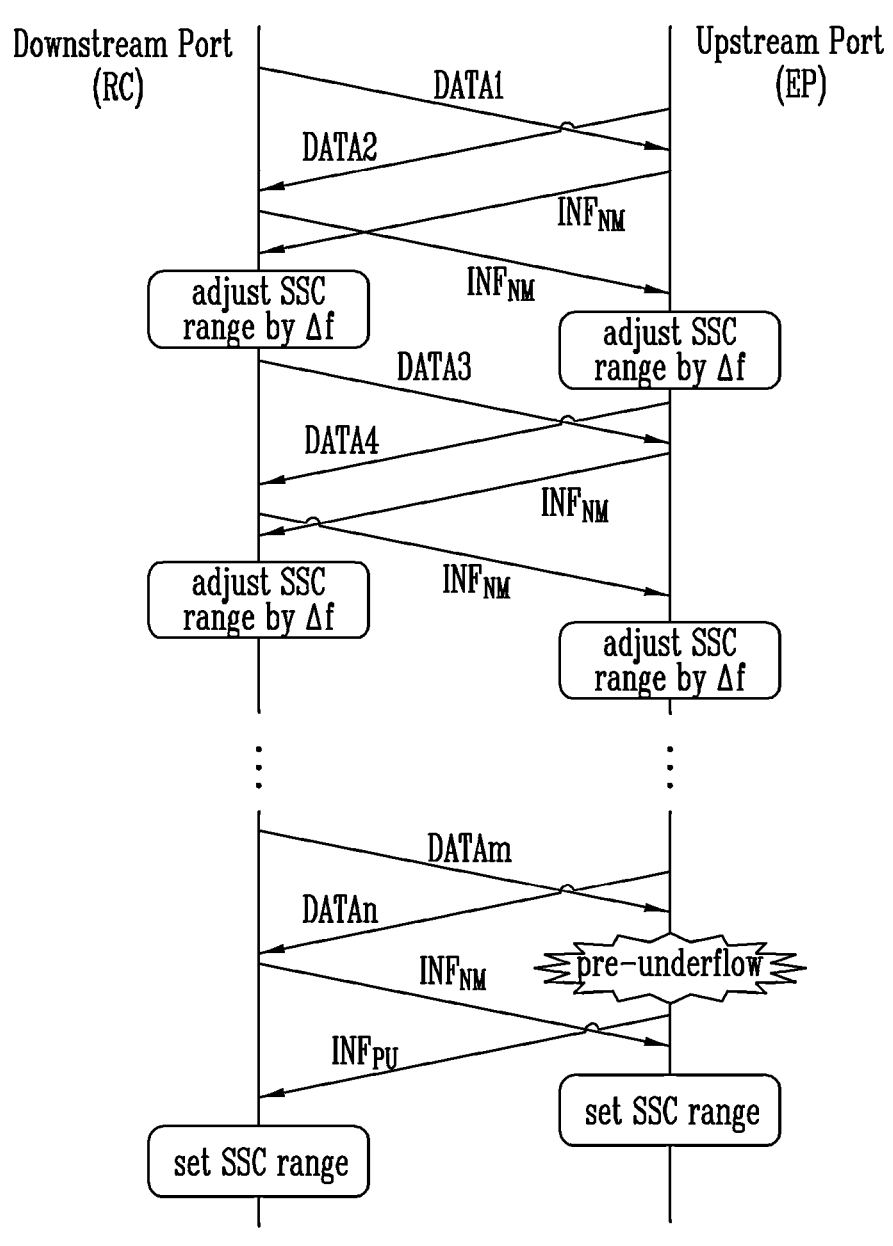
FIG. 13 is a ladder diagram showing another example of the steps shown in FIG. 10.

FIG. 13 is a ladder diagram showing another example of the steps shown in FIG. 10. Referring to FIG. 13, similarly to FIG. 11, the data transmission and reception between the downstream port and the upstream port is shown. As an example, the downstream port may be the root complex RC. In some implementations, the upstream port may be the endpoint EP, as will be discussed with reference to FIGS. 10 and 13 together.

The first data DATA1 is transmitted from the downstream port to the upstream port, and the second data DATA2 is transmitted from the upstream port to the downstream port (S230). Each of the first data DATA1 and the second data DATA2 may include at least one of the TS1 ordered-set TS1 OS and the TS2 ordered-set TS2 OS.

When the pre-overflow or the pre-underflow is not generated in the elastic buffer of the endpoint EP even though the first data DATA1 is received, normal status information $INF_{NM}$ is transferred from the upstream port to the downstream port. The normal status information $INF_{NM}$ is information indicating that the elastic buffer of a corresponding interface device is in the normal status.

In some implementations, when the pre-overflow or the pre-underflow is not generated in the elastic buffer of the root complex RC even though the second data DATA2 is received, the normal status information $INF_{NM}$ is transferred from the downstream port to the upstream port.

Each of the root complex RC and the end point EP determines whether the pre-underflow or the pre-overflow is generated (S240). Since the elastic buffers of each of the root complex RC and the endpoint EP are in the normal status, and the normal status information $INF_{NM}$ indicating that the elastic buffer of a counterpart interface device is in the normal status is received, the root complex RC and the endpoint adjust the SSC range by the step value $\Delta f$ (S220). Based on the adjusted SSC range, the third data DATA3 is transmitted from the downstream port to the upstream port, and fourth data DATA4 is transmitted from the upstream port to the downstream port (S230). Since the elastic buffer is in the normal status in spite of reception of the third and fourth data DATA3 and DATA4, each of the root complex RC and the endpoint EP transfers the normal status information $INF_{NM}$ to the counterpart interface device. Thereafter, the root complex RC and the end point adjusts the SSC range by the step value $\Delta f$ (S220). Such processes are repeated until the pre-underflow or the pre-overflow is generated.

The m-th data DATAm is transmitted from the downstream port to the upstream port, and the n-th data DATAn is transmitted from the upstream port to the downstream port (S230).

In the case of the root complex RC, the pre-overflow or the pre-underflow is not generated in its elastic buffer while receiving the n-th data DATAn. Therefore, the normal status information $INF_{NM}$ is transferred to the end point EP.

In the case of the end point EP, the pre-underflow is generated in the elastic buffer as the m-th data DATAm is received. Therefore, in despite of the received normal status information $INF_{NM}$, the end point EP determines the current SSC range as the optimal SSC range. The determined optimal SSC range may be set as the SSC range to be used for data communication later.

As the pre-underflow is generated in the elastic buffer of the endpoint EP, the endpoint EP transfers pre-underflow information $INF_{PU}$ indicating that the pre-underflow is generated in its elastic buffer to the root complex RC. As the root complex RC receives the pre-underflow information $INF_{PU}$, the root complex RC determines the current SSC range as the optimal SSC range.

In a case of the embodiment of FIG. 11, when the pre-overflow or the pre-underflow is not generated in its elastic buffer based on the data reception, the root complex RC or the end point EP first adjusts the SSC range by the step value $\Delta f$. When the pre-overflow information $INF_{PO}$ or the pre-underflow information $INF_{PU}$ is received from the counterpart in a state in which the SSC range is adjusted, the adjusted SSC range is re-adjusted again by the minus step value $-\Delta f$.

On the other hand, in a case of the embodiment of FIG. 13, the root complex RC or the endpoint EP adjusts the SSC range next to receiving the normal status information $INF_{NM}$ from the counterpart, even though the pre-overflow or the pre-underflow is not generated in its elastic buffer based on the data reception. Accordingly, as in the embodiment of FIG. 11, a situation in which the SSC range is required to be adjusted by the minus step value $-\Delta f$ does not occur.

FIGS. 10 to 13 show an embodiment in which the optimal SSC range is determined while increasing the SSC range by the step value from the initial SSC range. However, the disclosed technology is not limited thereto, and an embodiment in which the optimal SSC range is determined while decreasing the SSC range by the step value from the initial SSC range is also possible. In some implementations, FIG. 12 shows an embodiment in which the optimal SSC range is determined based on the down-spreading method, however, the disclosed technology is not limited thereto. That is, the optimal SSC range may be determined based on the center-spreading or up-spreading method.

Figure 14:
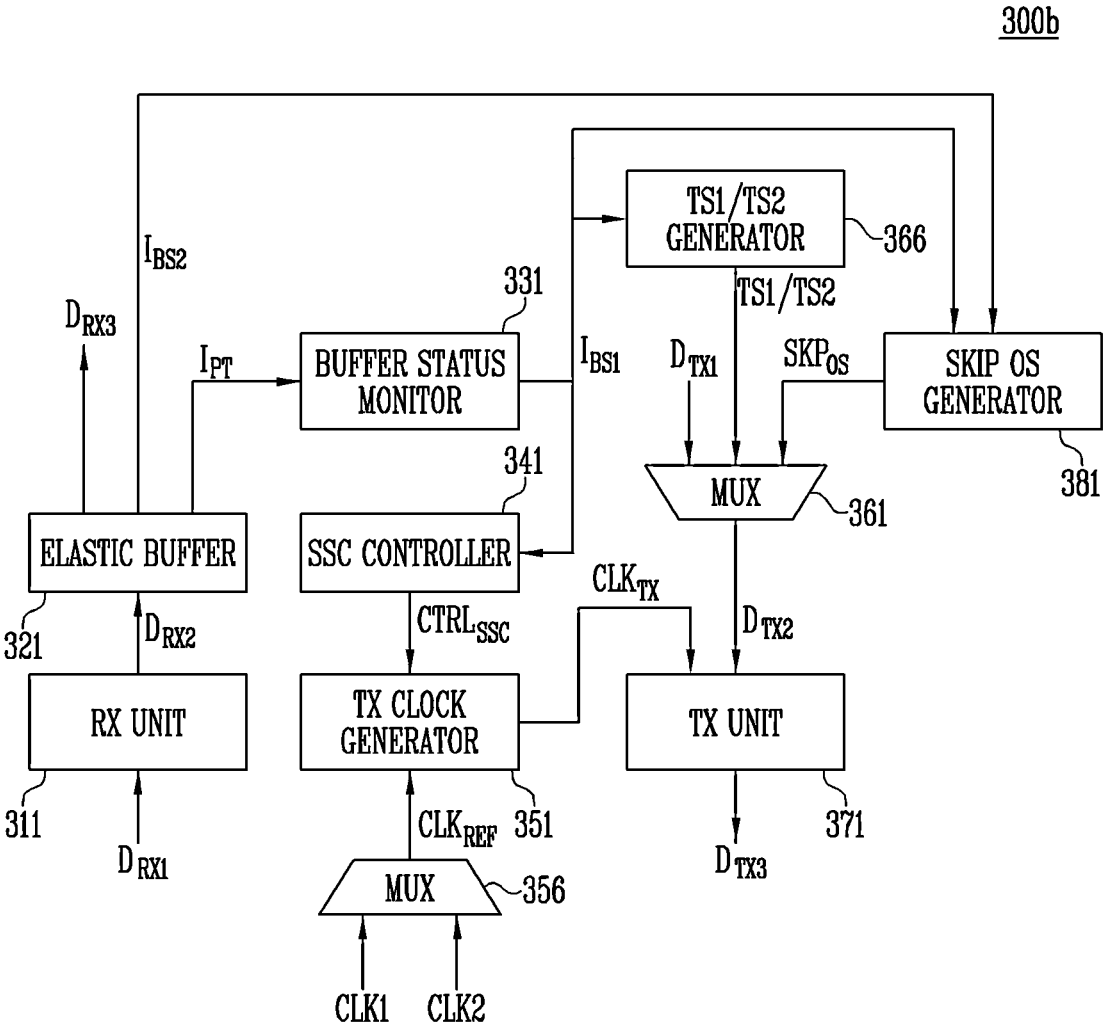
FIG. 14 is a block diagram illustrating an interface device 300*b* based on another embodiment of the disclosed technology.

FIG. 14 is a block diagram illustrating an interface device 300b based on another embodiment of the disclosed technology. Referring to FIG. 14, the interface device 300b may include a receiver 311, an elastic buffer 321, a buffer status monitor 331, an SSC controller 341, a transmission clock generator 351, and MUXes 356 and 361, TS1/TS2 generator 366, a transmitter 371, and a skip OS generator 381.

The receiver 311 receives data $D_{RX1}$ through a link. The receiver 311 may include a deserializer, a descrambler, a clock data recovery (CDR), and the like. The receiver 311 may generate and output data $D_{RX2}$ based on the data $D_{RX1}$. As an example, the data $D_{RX1}$ may be serial data, and the data $D_{RX2}$ may be parallel data.

The data $D_{RX2}$ may be transferred to the elastic buffer 321. The elastic buffer 321 may temporarily store the data $D_{RX2}$ and transfer data $D_{RX3}$ to an inner core (not shown) of the interface device 300b.

In some implementations, pointer information $I_{PT}$ of the elastic buffer 321 may be transferred to the buffer status monitor 331. The pointer information $I_{PT}$ of the elastic buffer 321 may be used to indicate a position of the last data in the elastic buffer 321 implemented in a FIFO form. A status of the elastic buffer 321 may be determined based on the pointer information $I_{PT}$, and thus first buffer status information $I_{BS1}$ may be generated. The first buffer status information $I_{BS1}$ is used to indicate the status of the elastic buffer 321 included in the interface device 300b. Determining the status of the elastic buffer 321 based on the pointer information $I_{PT}$ is described above with reference to FIGS. 5A to 8C.

In some implementations, second buffer status information $I_{BS2}$ may be transferred from the elastic buffer 321 to the skip OS generator 381. The second buffer status information $I_{BS2}$ may include information on an elastic buffer status of another interface device communicating with the interface device 300b. In this case, the second buffer status information $I_{BS2}$ may be received by the receiver 311 as the data $D_{RX1}$. For example, when the interface device 300*b* shown in FIG. 14 is the interface device A 201 of FIG. 2, the second buffer status information $I_{BS2}$ may include information on status of the elastic buffer included in the interface device B 203. In this case, the second buffer status information $I_{BS2}$ may be transferred from the transmitter TX of the interface device B 203 to the receiver RX of the interface device A.

In some implementations, the TS1/TS2 generator 366 may generate a TS1 ordered-set TS1 OS and a TS2 ordered-set TS2 OS based on the first status information $I_{BS1}$. The generated TS1 OS and the TS2 OS may be transferred to the MUX 361. The TS1 OS or the TS2 OS may be transferred to the other interface device, and a corresponding interface device may adjust an interval at which the interface device generates the skip OS.

The skip OS generator 381 may receive the first status information $I_{BS1}$ and the second status information $I_{BS2}$ and determine an interval at which the skip OS $SKP_{OS}$ is generated and inserted between transmission data.

The SSC controller 341 generates an SSC control signal $CTRL_{SSC}$. The transmission clock generator 351 receives the SSC control signal $CTRL_{SSC}$ from the SSC controller 341. In addition, the transmission clock generator 351 receives a reference clock $CLK_{REF}$. The reference clock $CLK_{RE}$ may be received from the MUX 356. The MUX 356 may select any one of a first clock CLK1 and a second clock CLk2 and transfer the selected clock to the transmission clock generator 351 as the reference clock $CLK_{REF}$. As an example, the first clock CLK1 may be a reference clock received from the outside of the interface device 300*b*. In this case, the first clock CLK1 may be a 100 MHz reference clock received from the host. As an example, the second clock CLK2 may be a reference clock generated from an internal clock generator (not shown) of the interface device 300*b*. In this case, the second clock CLK2 may be an internal reference clock used for a separate reference clock with independent SSC (SRIS) mode or a separate reference clock with no SSC (SRNS) mode. The transmission clock generator 351 may generate a transmission clock $CLK_{TX}$ in which a spectrum is spread based on the reference clock $CLK_{REF}$, based on the SSC control signal $CTRL_{SSC}$. At this time, an SSC range of the transmission clock $CLK_{TX}$ may be determined by the SSC controller 341. The transmission clock $CLK_{TX}$ may be transferred to the transmitter 371.

In some implementations, the buffer status monitor 331 may transfer the first buffer status information $I_{BS1}$ to the MUX 361. The MUX 361 may receive the data $D_{TX1}$ from the inner core (not shown) of the interface device 300*b* in addition to the first buffer status information $I_{BS1}$. In addition, the MUX 361 may receive the skip OS $SKP_{OS}$ from the skip OS generator 381. In addition, the MUX 361 may receive the TS1 OS or the TS2 OS from the TS1/TS2 generator 366. The MUX 361 may multiplex the first buffer status information $I_{BS1}$, the data $D_{TX1}$, the TS1 OS, the TS2 OS, and the skip OS $SKP_{OS}$ and transmit the data $D_{TX2}$ to the transmitter 371. That is, as well as the data $D_{TX1}$ transferred from the inner core, the first buffer status information $I_{BS1}$ received from the buffer status monitor 331, the TS1 OS or the TS2 OS received from the TS1/TS2 generator 366, the skip OS $SKP_{OS}$ received from the skip OS generator 381 may also be transferred to the transmitter 371 as the data $D_{TX2}$.

The transmitter 371 may receive the data $D_{TX2}$ and the transmission clock $CLK_{TX}$ and generate the data $D_{TX3}$ based on the data $D_{TX2}$ and the transmission clock $CLK_{TX}$. The transmitter 371 may include a serializer, a scrambler, and the like. As an example, the data $D_{TX2}$ may be parallel data, and the data $D_{TX3}$ may be serial data output based on the transmission clock $CLK_{TX}$. The generated data $D_{TX3}$ may be transferred to the other interface device connected through the link.

As described above, the interface device 330*b* based on an embodiment of the disclosed technology may determine the interval at which the skip OS is inserted based on the first buffer status information $I_{BS1}$ indicating the status of own elastic buffer or the second buffer status information $I_{BS2}$ indicating the status included in the other interface device 330*b* connected through the link. Accordingly, the insertion interval of the skip OS used for data transmission and reception may be adaptively determined based on a link characteristic.

Figure 15:
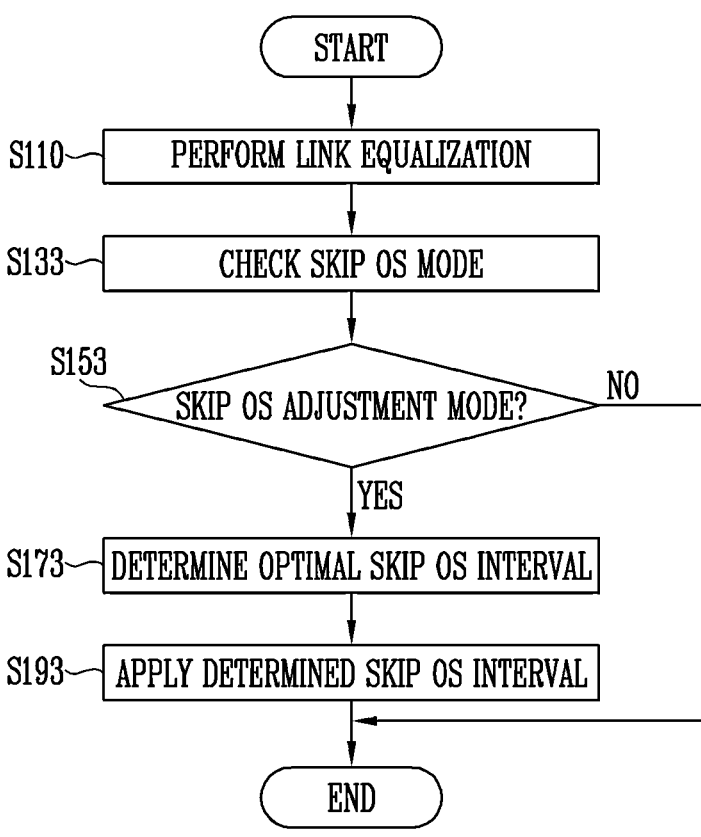
FIG. 15 is a flowchart illustrating a method of operating an interface device based on another embodiment of the disclosed technology.

FIG. 15 is a flowchart illustrating a method of operating an interface device based on another embodiment of the disclosed technology. More specifically, FIG. 15 shows a flowchart for performing a link initialization operation between interface devices based on an embodiment of the disclosed technology.

Referring to FIG. 15, a method of operating an interface device may include performing link equalization (S110), checking a skip OS mode (S133), when the skip OS mode is a skip OS adjustment mode (S153: Yes), determining an optimal skip OS interval (S173), and applying the determined skip OS interval (S193).

In step S110, the link equalization is performed. Step S110 of FIG. 15 may be substantially the same as step S110 of FIGS. 3 and 9. Therefore, repetitive description is omitted.

In step S133, the interface device may check the skip OS mode. Based on an embodiment of the disclosed technology, the interface device may adaptively determine the skip OS interval or use a predetermined skip OS interval based on the skip OS mode.

At S153, it is determined whether the skip OS mode is a skip OS adjustment mode. When the skip OS mode is not the skip OS adjustment mode (S153: No), the interface device may use the predetermined skip OS interval. Accordingly, the link initialization operation between the interface devices is ended.

When the skip OS mode is the skip OS adjustment mode (S153: Yes), the interface device may adaptively determine the skip OS interval. Accordingly, the method proceeds to step S173 to determine the optimal skip OS interval.

At S173, the optimal skip OS interval is determined. More specifically, in step S173, the optimal interval at which the skip OS is inserted into the output data may be determined. In accordance with an interface device and a method of operating the same based on an embodiment of the disclosed technology, the optimal skip OS interval may be determined based on the link characteristic between the interface devices, rather than using a fixed skip OS interval. A detailed method of determining the optimal skip OS interval will be discussed below with reference to FIGS. 16 to 19D.

At S193, the determined skip OS interval may be applied. Therefore, the link initialization operation may be completed. In a subsequent data transmission and reception operation, the interface device may insert the skip OS into the output data based on the determined skip OS interval.

Figure 16:
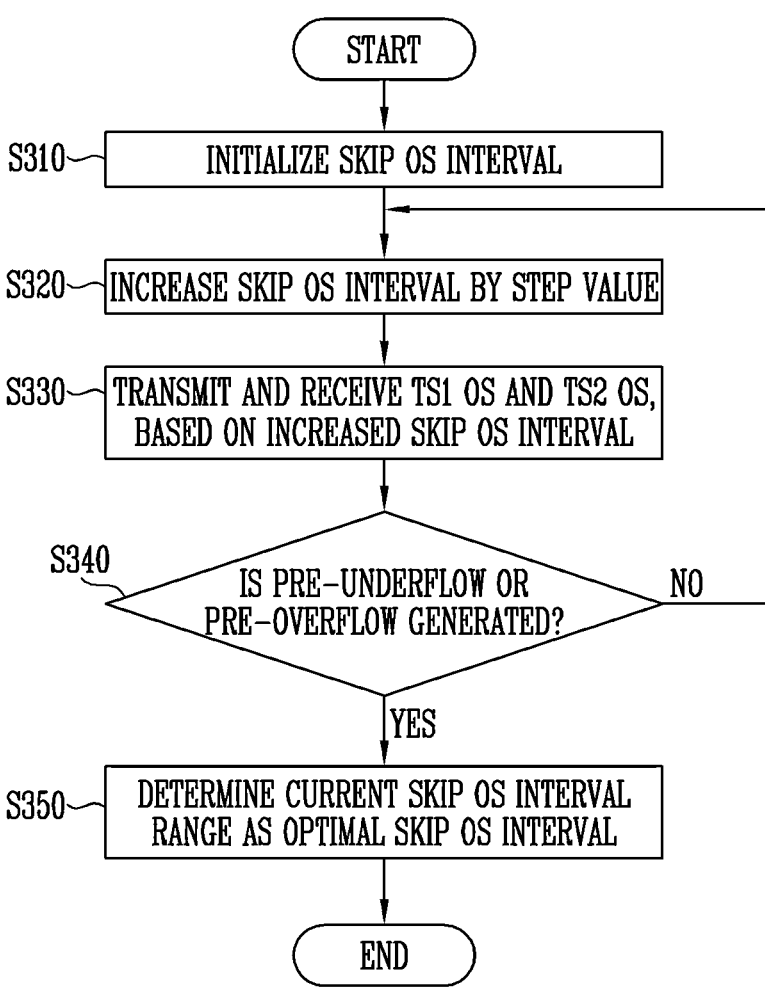
FIG. 16 is a flowchart illustrating an example of step S173 of FIG. 15.

FIG. 16 is a flowchart illustrating an example of step S173 of FIG. 15. Referring to FIG. 16, in order to determine the optimal skip OS interval, the interface device first initializes the skip OS interval (S310). In step S310, the initialized skip OS interval may have a relatively large value. Accordingly, the skip OS may be inserted into the output data at a low frequency in the initial stage.

In step S310, the skip OS interval is adjusted by a step value. In an embodiment, in step S310, the skip OS interval may be increased by the step value. Thereafter, in step S330, the interface device 300b may transmit and receive the TS1 ordered-set TS1 OS and the TS2 ordered-set TS2 OS based on the adjusted skip OS interval. That is, the interface device 300b may transmit and receive the TS1 ordered-set TS1 OS and the TS2 ordered-set TS2 OS to and from the other interface device based on the adjusted skip OS interval.

In a process of transmitting and receiving the TS1 ordered-set TS1 OS and the TS2 ordered-set TS2 OS, the interface device 300b determines whether the pre-underflow or the pre-overflow is generated in the elastic buffer 321 of the interface device 300a or the elastic buffer of the other interface device.

Whether the pre-underflow or the pre-overflow is generated in the elastic buffer 321 of the interface device 300b may be determined by the buffer status monitor 331 shown in FIG. 14. The buffer status monitor 331 receives the pointer information $I_{PT}$ of the elastic buffer 321 and determines the current status of the elastic buffer 321 based on the pointer information $I_{PT}$. As described with reference to FIGS. 6A to 8C, the buffer status monitor 331 may determine whether the elastic buffer 321 is currently in the normal status, the pre-overflow status, the pre-underflow status, the overflow status, or the underflow status based on the position indicated by the pointer of the elastic buffer 321. When the pre-overflow or the pre-underflow is generated in the elastic buffer 321, the buffer status monitor may generate the first buffer status information $I_{BS1}$ indicating that the pre-overflow or the pre-underflow is generated and transfer the first buffer status information $I_{BS1}$ to the skip OS generator 381.

Whether the pre-underflow or the pre-overflow is generated in the elastic buffer of the other interface device communicating with the interface device 300b through the link may be determined through the second buffer status information $I_{BS2}$. When the pre-underflow or the pre-overflow is generated in the elastic buffer of the other interface device, the corresponding interface device may transfer information indicating that the pre-overflow or the pre-underflow is generated to the interface device 300b as the data $D_{RX1}$. The data $D_{RX1}$ is converted to the data $D_{RX2}$ by the receiver 311 and transferred to the elastic buffer 321. Among the data $D_{RX2}$, the second buffer status information $I_{BS2}$ indicating that the pre-underflow or the pre-overflow is generated in the elastic buffer of the other interface device may be extracted and transferred to the skip OS generator 381.

Therefore, the skip OS generator 381 may determine whether the pre-overflow or the pre-underflow is generated in the elastic buffer 321 based on the first buffer status information $I_{BS1}$. In some implementations, the skip OS generator 381 may determine whether the pre-overflow or the pre-underflow is generated in the elastic buffer of the other interface device connected to the interface device 300b based on the second buffer status information $I_{BS2}$.

When the pre-underflow or the pre-overflow is not generated in the elastic buffer 321 of the interface device 300b or the elastic buffer of the other interface device (S340: No), the method returns to step S320 to re-change the skip OS interval range by the step value. Thereafter, the interface device 300b may transmit and receive the TS1 ordered-set TS1 OS and the TS2 ordered-set TS2 OS based on the adjusted skip OS interval (S330). Steps S320, S330, and S340 are repeated until the pre-underflow or the pre-overflow is generated in the elastic buffer 321 of the interface device 300b or the elastic buffer of the other interface device.

When the pre-underflow or the pre-overflow is generated in the elastic buffer 321 of the interface device 300b or the elastic buffer of the other interface device (S340: Yes), the current skip OS interval is determined as the optimal skip OS interval. Accordingly, in accordance with the interface device and the method of operating the same based on an embodiment of the disclosed technology, the optimal skip OS interval may be determined by adaptively changing the skip OS interval until the pre-overflow or the pre-underflow is generated.

Figure 17:
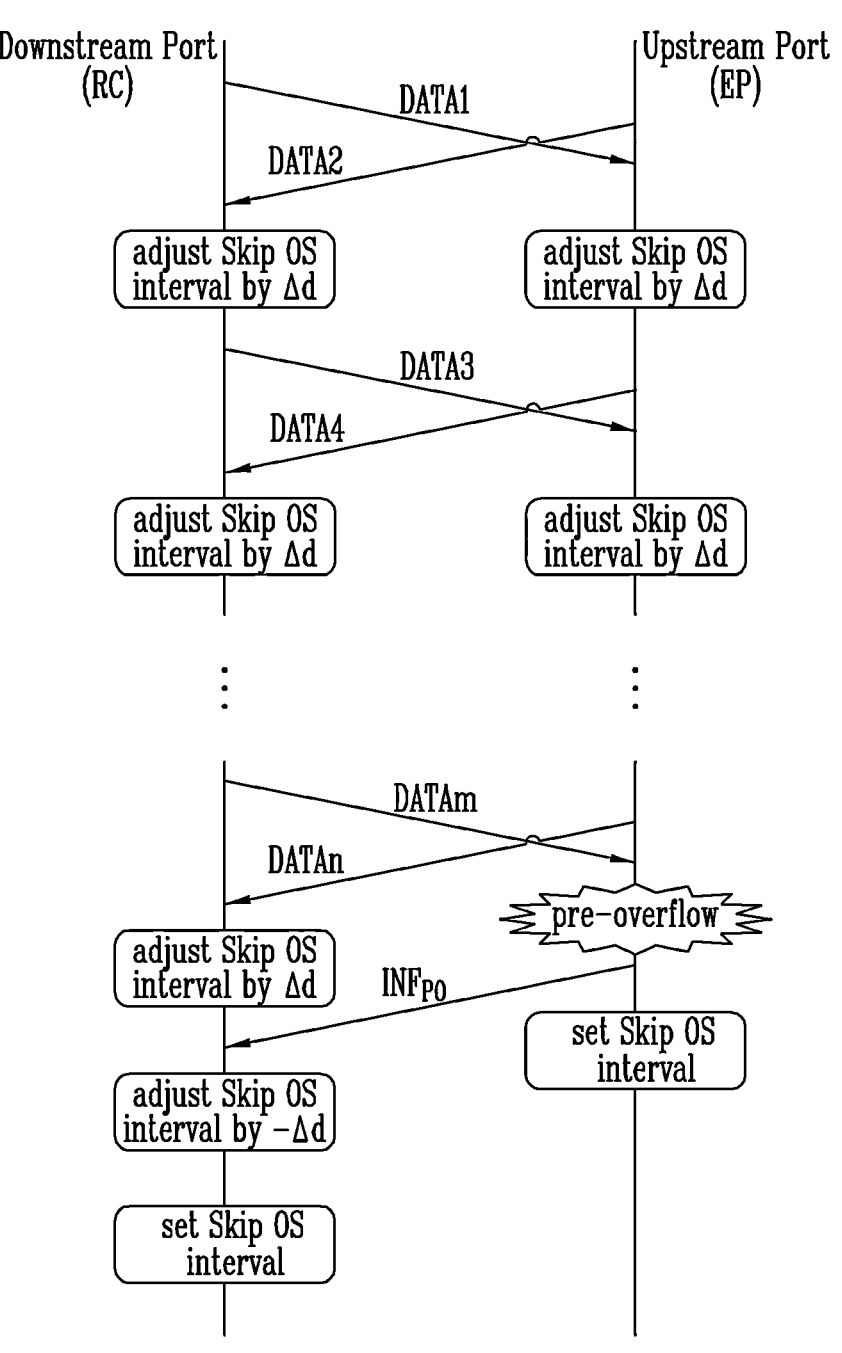
FIG. 17 is a ladder diagram showing an example of steps shown in FIG. 16.

FIG. 17 is a ladder diagram showing an example of the steps shown in FIG. 16. Referring to FIG. 17, data transmission and reception between a downstream port and an upstream port is shown. As an example, the downstream port may be the root complex RC. In some implementations, the upstream port may be the endpoint EP, as will be discussed below with reference to FIGS. 16 and 17.

First data DATA1 is transmitted from the downstream port to the upstream port, and second data DATA2 is transmitted from the upstream port to the downstream port (S330). Each of the first data DATA1 and the second data DATA2 may include at least one of the TS1 ordered-set TS1 OS and the TS2 ordered-set TS2 OS.

Each of the root complex RC and the end point EP determines whether the pre-underflow or the pre-overflow is generated (S340). Since the pre-underflow or the pre-overflow is not generated, the skip OS interval is adjusted by a step value $\Delta d$ (S320). That is, the skip OS interval is increased by the step value $\Delta d$. Based on the skip OS interval, third data DATA3 is transmitted from the downstream port to the upstream port, and fourth data DATA4 is transmitted from the upstream port to the downstream port (S330). Thereafter, each of the root complex RC and the end point EP determines whether the pre-underflow or the pre-overflow is generated (S340). Since the pre-underflow or the pre-overflow is not generated, the skip OS interval is increased by the step value $\Delta d$ (S320). Such processes are repeated until the pre-underflow or the pre-overflow is generated.

m-th data DATAm is transmitted from the downstream port to the upstream port, and n-th data DATAn is transmitted from the upstream port to the downstream port (S330).

In a case of the root complex RC, the pre-overflow or the pre-underflow is not generated in its elastic buffer while receiving the n-th data DATAn. Therefore, the skip OS interval may be increased by the step value $\Delta d$ (S320). On the other hand, in a case of the end point EP, the pre-overflow is generated in the elastic buffer as the m-th data DATAm is received. Therefore, the endpoint EP determines the current skip OS interval as the optimal skip OS interval. The determined optimal skip OS interval may be set as the skip OS interval to be used for data communication later.

As the pre-overflow is generated in the elastic buffer of the endpoint EP, the endpoint EP transfers pre-overflow information $INF_{PO}$ indicating that the pre-overflow is generated in its elastic buffer to the root complex RC. As the root complex RC receives the pre-overflow information $INF_{PO}$, the root complex RC may decrease the skip OS interval by the step value $\Delta d$. This is to correct increasing the skip OS interval by the step value $\Delta d$ by the root complex RC immediately before to match with the skip OS interval of the endpoint. Thereafter, the root complex RC determines the current skip OS interval as the optimal skip OS interval.

Figure 18:
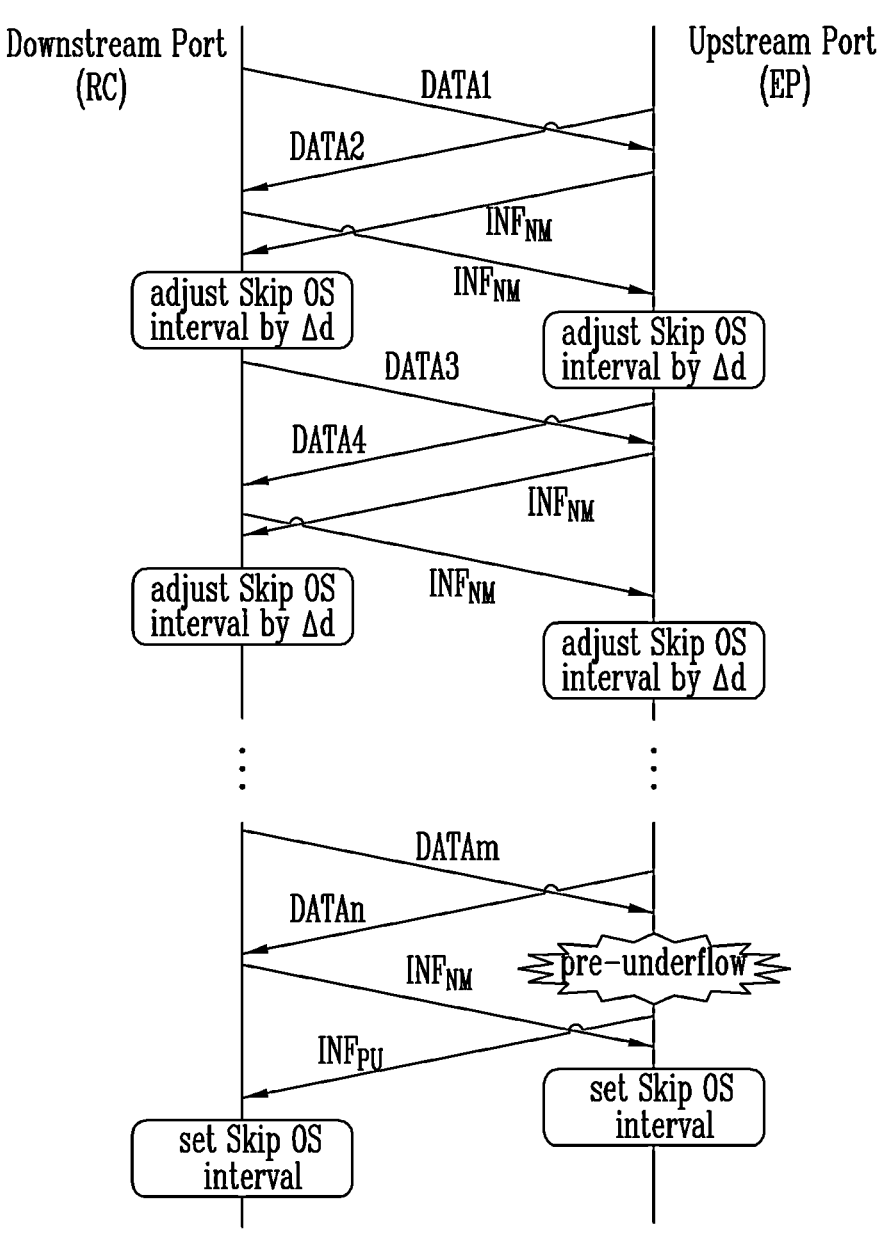
FIG. 18 is a ladder diagram for describing another embodiment of the steps shown in FIG. 16.

FIG. 18 is a ladder diagram for describing another embodiment of the steps shown in FIG. 16. Referring to FIG. 18, similarly to FIG. 17, the data transmission and reception between the downstream port and the upstream port is shown. As an example, the downstream port may be the root complex RC. In some implementations, the upstream port may be the endpoint EP. Hereinafter, description will be given with reference to FIGS. 16 and 18 together.

The first data DATA1 is transmitted from the downstream port to the upstream port, and the second data DATA2 is transmitted from the upstream port to the downstream port (S330). Each of the first data DATA1 and the second data DATA2 may include at least one of the TS1 ordered-set TS1 OS and the TS2 ordered-set TS2 OS.

When the pre-overflow or the pre-underflow is not generated in the elastic buffer of the endpoint EP even though the first data DATA1 is received, normal status information $INF_{NM}$ is transferred from the upstream port to the downstream port. The normal status information $INF_{NM}$ is used to indicate that the elastic buffer of a corresponding interface device is in the normal status.

In some implementations, when the pre-overflow or the pre-underflow is not generated in the elastic buffer of the root complex RC even though the second data DATA2 is received, the normal status information $INF_{NM}$ is transferred from the downstream port to the upstream port.

Each of the root complex RC and the end point EP determines whether the pre-underflow or the pre-overflow is generated (S340). Since the elastic buffers of each of the root complex RC and the endpoint EP are in the normal status, and the normal status information $INF_{NM}$ indicating that the elastic buffer of a counterpart interface device is in the normal status is received, the root complex RC and the endpoint increase the skip OS interval by the step value Δd (S320). Based on the adjusted skip OS interval, the third data DATA3 is transmitted from the downstream port to the upstream port, and fourth data DATA4 is transmitted from the upstream port to the downstream port (S330). Since the elastic buffer is in the normal status in spite of reception of the third and fourth data DATA3 and DATA4, each of the root complex RC and the endpoint EP transfers the normal status information $INF_{NM}$ to the counterpart interface device. Thereafter, the root complex RC and the end point increases the skip OS interval by the step value Δd (S320). Such processes are repeated until the pre-underflow or the pre-overflow is generated.

The m-th data DATAm is transmitted from the downstream port to the upstream port, and the n-th data DATAn is transmitted from the upstream port to the downstream port (S330).

In the case of the root complex RC, the pre-overflow or the pre-underflow is not generated in its elastic buffer while receiving the n-th data DATAn. Therefore, the normal status information $INF_{NM}$ is transferred to the end point EP.

In the case of the end point EP, the pre-underflow is generated in the elastic buffer as the m-th data DATAm is received. Therefore, in despite of the received normal status information $INF_{NM}$, the end point EP determines the current skip OS interval as the optimal skip OS interval. The determined skip OS interval may be set as the skip OS interval to be used for data communication later.

As the pre-underflow is generated in the elastic buffer of the endpoint EP, the endpoint EP transfers pre-underflow information $INF_{PU}$ indicating that the pre-underflow is generated in its elastic buffer to the root complex RC. As the root complex RC receives the pre-underflow information $INF_{PU}$, the root complex RC determines the current skip OS interval as the optimal skip OS interval.

In a case of the embodiment of FIG. 17, when the pre-overflow or the pre-underflow is not generated in its elastic buffer based on the data reception, the root complex RC or the end point EP first increases the skip OS interval by the step value Δd. When the pre-overflow information $INF_{PO}$ or the pre-underflow information $INF_{PU}$ is received from the counterpart in a state in which the skip OS interval is decreased, the adjusted skip OS interval is decreased again by the step value Δd.

On the other hand, in a case of the embodiment of FIG. 18, the root complex RC or the endpoint EP adjusts the skip OS interval next to receiving the normal status information $INF_{NM}$ from the counterpart, even though the pre-overflow or the pre-underflow is not generated in its elastic buffer based on the data reception. Accordingly, as in the embodiment of FIG. 17, a situation in which the skip OS interval is required to be decreased again by the step value Δd does not occur.

Figures 19A, 19B, 19C, 19D:
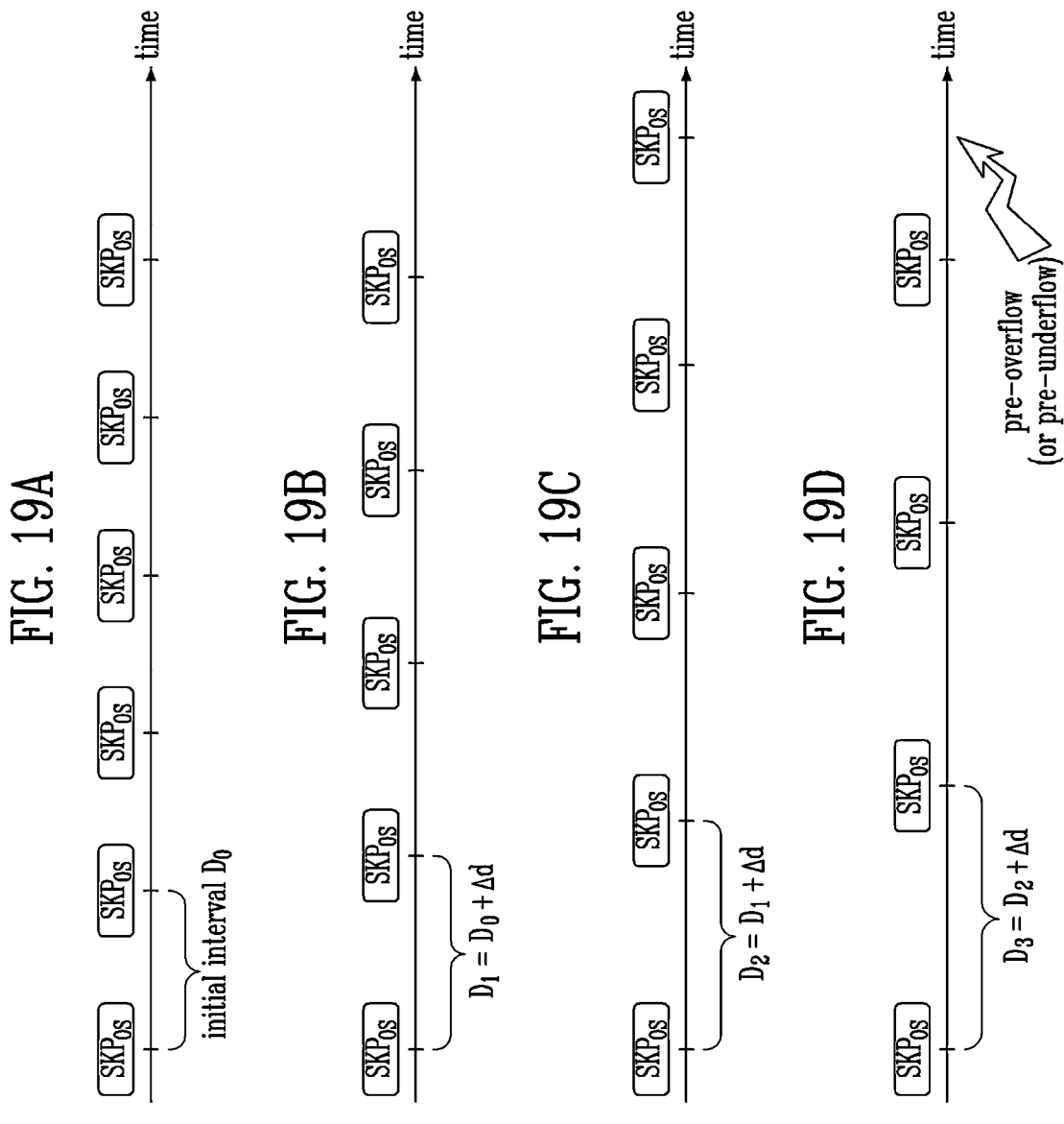
FIGS. 19A to 19D are graphs showing the steps shown in FIG. 16.

FIGS. 19A to 19D are graphs showing the steps shown in FIG. 16. Referring to FIG. 19A, a graph in which data is transmitted by inserting a skip OS based on an initial interval $D_0$ is shown. As shown in FIG. 19A, the skip OS is inserted for each initial interval $D_0$.

When the pre-overflow or the pre-underflow is not generated in a process of transmitting and receiving data by inserting the skip OS based on the initial interval $D_0$ as shown in FIG. 19A, the skip OS interval is increased by the step value Δd as shown in FIG. 19B. Accordingly, the skip OS is inserted for each adjusted skip OS interval $D_1$.

As shown in FIG. 19B, when the pre-overflow or the pre-underflow is not generated in a process of transmitting and receiving data by inserting the skip OS based on the adjusted interval $D_1$, the skip OS interval is increased again by the step value Δd as shown in FIG. 19C. Accordingly, the skip OS is inserted for each adjusted skip OS interval $D_2$.

As shown in FIG. 19C, when the pre-overflow or the pre-underflow is not generated in a process of transmitting and receiving data by inserting the skip OS based on the adjusted interval $D_2$, the skip OS interval is increased again by the step value Δd as shown in FIG. 19D. Accordingly, the skip OS is inserted for each adjusted skip OS interval $D_3$. When the pre-overflow or the pre-underflow is generated as a result of transmitting and receiving data by inserting the skip OS for each adjusted skip OS interval $D_3$, the current skip OS interval $D_3$ is determined as the optimal skip OS interval.

FIGS. 16 to 19D show an embodiment in which the optimal skip OS interval is determined while increasing the skip OS interval by the step value from the initial skip OS interval. However, the disclosed technology is not limited thereto, and an embodiment in which the optimal skip OS interval is determined while decreasing the skip OS interval by the step value from the initial skip OS interval is also possible.

The embodiments of the disclosed technology disclosed in the present specification and drawings are merely specific examples for easily describing the technical content of the disclosed technology and facilitating understanding of the disclosed technology and do not limit the scope of the disclosed technology. It will be apparent to a person skilled in the art to which the disclosed technology pertains that other modifications based on the technical spirit of the disclosed technology may be carried out in addition to the embodiments disclosed herein.

What is claimed is:

1. A method of operating an interface device including a first buffer and in communication with another interface device including a second buffer, the method comprising:
   initializing one or more parameters associated with a data transmission or reception of the interface device;
   receiving a status information indicating that an overflow or an underflow is generated at the second buffer;
   adjusting the one or more parameters associated with the data transmission or reception of the interface device based on the status information; and
   performing the data transmission or reception based on the adjusted one or more parameters.

2. The method of claim 1, wherein adjusting the one or more parameters includes adjusting a clock frequency range of a spread spectrum clocking scheme.

3. The method of claim 2, wherein adjusting the clock frequency range of the spread spectrum clocking scheme comprises:
   initializing the clock frequency range based on a fundamental frequency;
   adjusting the clock frequency range by a predetermined step value;
   performing the data transmission or reception based on the adjusted clock frequency range; and
   determining whether a pre-underflow or a pre-overflow is generated in at least one of the first buffer and the second buffer during the data transmission or reception.

4. The method of claim 3, further comprising:
   selecting, upon determination that the pre-underflow or the pre-overflow is generated in the second buffer during the data transmission or reception, a currently applied clock frequency range as the clock frequency range of the spread spectrum clocking scheme.

5. The method of claim 3, further comprising:
   re-adjusting, upon determination that neither the pre-underflow nor the pre-overflow is generated in the second buffer during the data transmission or reception, the clock frequency range by the step value;
   performing at least one of data transmission or reception based on the adjusted clock frequency range; and
   determining whether the pre-underflow or the pre-overflow is generated in at least one of the first buffer and the second buffer based on the data transmission or reception.

6. The method of claim 3, wherein adjusting the clock frequency range by the step value includes increasing the clock frequency range by the step value.

7. The method of claim 1, wherein adjusting the one or more parameters includes determining an interval for inserting a skip ordered-set into the transmission data.

8. The method of claim 7, wherein determining the interval for inserting the skip ordered-set into the transmission data comprises:
   initializing the interval for inserting the skip ordered-set;
   adjusting the interval by a predetermined step value; and
   performing the data transmission or reception including the skip ordered-set based on the adjusted interval.

9. The method of claim 8, further comprising:
   determining whether an overflow or an underflow is generated in at least one of the first buffer and the second buffer based on the data transmission or reception; and
   selecting, upon determination that the overflow or the underflow is generated in the second buffer, a current interval as the interval for inserting the skip ordered-set.

10. The method of claim 9, wherein adjusting the interval by the predetermined step value includes increasing the interval by the predetermined step value.

11. A method of operating an interface device including a first buffer and in communication with another interface device including a second buffer, the method comprising:
   initializing one or more parameters associated with clock signals for a data transmission or reception of the interface device;
   adjusting the one or more parameters by a step value;
   performing at least one of transmission or reception of data to and from the other interface device communicating with the interface device based on the adjusted one or more parameters;
   receiving, from the other interface device, a status information indicating a status of the second buffer; and
   determining whether a pre-underflow or a pre-overflow is generated in the second buffer based on the status information.

12. The method of claim 11, further comprising:
   selecting, upon determination that the pre-underflow or the pre-overflow is generated in the second buffer, current one or more parameters as an optimal transmission parameter.

13. The method of claim 11, further comprising:
   re-adjusting, upon determination that neither the pre-underflow nor the pre-overflow is generated in the second buffer during the data transmission or reception, the transmission parameter by the step value;
   performing at least one of transmission or reception of the data to and from the other interface device based on the adjusted one or more parameters;
   re-receiving, from the other interface device, the status information indicating a status of the second buffer; and
   determining whether the pre-underflow or the pre-overflow is generated in the second buffer based on the received status information.

14. The method of claim 11, wherein the one or more parameters include a clock frequency range of spread spectrum clocking scheme.

15. The method of claim 11, wherein the one or more parameters include an interval for inserting a skip ordered-set into the transmission data.

16. An interface device comprising:
   a receiver configured to receive data;
   a buffer in communication with the receiver and configured to store the received data;
   a transmitter configured to output skip ordered-sets;
   wherein the receiver is configured to receive a second status information indicating a status of another buffer included in another interface device;
   wherein an interval between the skip ordered-sets outputted from the transmitter is derived from a link characteristic;
   wherein the skip ordered-sets are used to compensate a difference in frequencies between bit rates at two ends of a link.

17. The interface device of claim 16, further comprising:
   a spread spectrum clocking controller configured to control a transmission clock generator and control a clock frequency of a spread spectrum clocking scheme; and
   a buffer status monitor configured to transfer first status information indicating the status of the buffer to the spread spectrum clocking controller;
   wherein the buffer transfers the second status information to the spread spectrum clocking controller; and wherein the spread spectrum clocking controller is configured to determine a clock frequency range of a spread spectrum clocking scheme based on the first status information and the second status information.

18. The interface device of claim 17, wherein:

the spread spectrum clocking controller initializes the clock frequency range based on a fundamental frequency and adjusts the clock frequency range by a step value;

the transmitter transmits data based on the adjusted clock frequency range;

the receiver receives data from the other interface device; and the spread spectrum clocking controller determines whether a pre-underflow or a pre-overflow is generated in the second buffer based on the first status information and the second status information generated based on a transmission and reception of the data.

19. The interface device of claim 18, wherein the spread spectrum clocking controller determines that a current clock frequency range as an optimal clock frequency range, when the pre-underflow or the pre-overflow is generated in the second buffer.

20. The interface device of claim 18, wherein when the pre-underflow or the pre-overflow is not generated in the first buffer or the second buffer, the spread spectrum clocking controller re-adjusts the clock frequency range by the step value, the transmitter re-transmits data based on the re-adjusted clock frequency range, the receiver re-receives data from the other interface device, and the spread spectrum clocking controller determines whether the pre-underflow or the pre-overflow is generated in the first buffer or the second buffer based on the first status information and the second status information generated based on the transmission and reception of the data.

21. The interface device of claim 16, further comprising:

a skip ordered-set generator configured to generate a skip ordered-set to be inserted into transmission data; and a buffer status monitor configured to transfer first status information indicating the status of the buffer to the skip ordered-set generator, wherein the buffer transfers the second status information to the skip ordered-set generator, and wherein the skip ordered-set generator is configured to determine an interval at which the skip ordered-set is generated, based on the first status information and the second status information.

22. The interface device of claim 21, wherein the skip ordered-set generator initializes the interval and adjusts the interval by a step value, the transmitter transmits data including the skip ordered-set generated based on the adjusted interval, the receiver receives data from the other interface device, and the skip ordered-set generator determines whether a pre-underflow or a pre-overflow is generated in the first buffer or the second buffer based on the first status information and the second status information generated based on a transmission and reception of the data.

23. The interface device of claim 22, wherein the skip ordered-set generator selects, upon determination that the pre-underflow or the pre-overflow is generated in the first buffer or the second buffer, a current interval as an optimal interval.

24. The interface device of claim 22, wherein, upon determination that neither the pre-underflow nor the pre-overflow is generated in the first buffer or the second buffer:

the skip ordered-set generator re-adjusts the interval by the step value;

the transmitter re-transmits data including the skip ordered-set generated based on the re-adjusted interval;

the receiver re-receives data from the other interface device; and the skip ordered-set generator re-determines whether the pre-underflow or the pre-overflow is generated in the first buffer or the second buffer, based on the first status information and the second status information generated based on the transmission and reception of the data.

25. The interface device of claim 16, further comprising:

a buffer status monitor in communication with the buffer and configured to monitor a status of the buffer.

26. The interface device of claim 16, further comprising:

a skip ordered-set generator configured to generate the skip ordered-sets to be inserted into transmission data.

27. The interface device of claim 16, further comprising:

a transmission clock generator configured to generate a transmission clock.

28. The interface device of claim 16, wherein at least one of a clock frequency range of a spread spectrum clocking scheme or the interval between the skip ordered-sets is determined based on a status of another buffer included in another interface device communicating with the interface device.

29. The interface device of claim 16, wherein the interval between the skip ordered-sets is determined based on a status of the buffer.

30. The interface device of claim 16, wherein the transmitter schedules the skip ordered-sets.

31. The interface device of claim 16, wherein the receiver includes the buffer for performing compensation.

* * * * *